(12) United States Patent
Kito

(10) Patent No.: US 7,392,675 B2
(45) Date of Patent: *Jul. 1, 2008

(54) SLOT MECHANISM AND SMART IGNITION SYSTEM

(75) Inventor: Shozo Kito, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/045,698

(22) Filed: Jan. 28, 2005

(65) Prior Publication Data

US 2005/0151423 A1 Jul. 14, 2005

(51) Int. Cl.
*B60R 25/02* (2006.01)

(52) U.S. Cl. ............... 70/252; 70/278.2; 70/278.7; 70/388; 70/414; 70/427; 70/455; 307/10.5; 307/10.6

(58) Field of Classification Search ............... 70/252, 70/455, 423–428, 388, 414, 453, 454, DIG. 51, 70/491, 496, 278.2, 278.3, 278.7, 345, 387, 70/413, DIG. 30, 182–186; 174/67; 439/135, 439/136, 140, 141; 307/10.3, 10.5, 10.6; 340/5.72, 5.31, 5.67, 426.11, 426.3

See application file for complete search history.

(56) References Cited

U.S. PATENT DOCUMENTS

| 190,035 | A | * | 4/1877 | Hillebrand | 70/453 |
| 438,534 | A | * | 10/1890 | Eiche | 70/428 |
| 446,176 | A | * | 2/1891 | Shaw | 70/453 |
| 448,981 | A | * | 3/1891 | Mix | 70/453 |
| 1,458,520 | A | * | 6/1923 | Castell | 70/356 |
| 1,946,722 | A | * | 2/1934 | Thompson | 70/388 |
| 2,021,443 | A | * | 11/1935 | Deutsch | 70/491 |
| 3,263,463 | A | * | 8/1966 | Duval et al. | 70/455 |
| 3,484,569 | A | * | 12/1969 | Euston | 200/43.08 |
| 3,492,843 | A | * | 2/1970 | Slaybaugh et al. | 70/388 |
| 3,552,160 | A | * | 1/1971 | Kleebauer | 70/388 |
| 4,090,175 | A | * | 5/1978 | Hart | 340/5.3 |
| 4,638,652 | A | * | 1/1987 | Morse et al. | 70/454 |
| 4,735,069 | A | * | 4/1988 | Steinbach | 70/491 |
| 4,858,453 | A | * | 8/1989 | Namazue | 70/278.3 |
| 5,254,996 | A | * | 10/1993 | Claar et al. | 341/176 |
| 6,351,206 | B1 | * | 2/2002 | Schweiger et al. | 340/5.64 |
| 6,370,929 | B1 | * | 4/2002 | Watanabe et al. | 70/423 |

(Continued)

FOREIGN PATENT DOCUMENTS

JP    2001-130381 A    5/2001

(Continued)

*Primary Examiner*—Lloyd A Gall
(74) *Attorney, Agent, or Firm*—Crompton, Seager & Tufte, LLC

(57) ABSTRACT

A slot mechanism having an accommodation space into which an insertion object is inserted through a slot. The slot mechanism includes a shutter located in the accommodation space. The shutter is movable along an insertion direction of the insertion object. When the insertion object is inserted into the accommodation space, the shutter is pressed by the insertion object and moved toward the back of the accommodation space. When the insertion object is removed from the accommodation space, the shutter is moved toward the slot to close the slot. The shutter has a guiding portion that stabilizes the attitude of the insertion object when the insertion object is pressed against the shutter.

10 Claims, 14 Drawing Sheets

U.S. PATENT DOCUMENTS

| | | | |
|---|---|---|---|
| 6,539,762 B1 * | 4/2003 | Wittwer | 70/423 |
| 6,546,768 B1 * | 4/2003 | Burghoff et al. | 70/252 |
| 6,550,298 B1 * | 4/2003 | Su | 70/276 |
| 6,776,016 B1 * | 8/2004 | Wittwer et al. | 70/252 |
| 6,803,675 B2 * | 10/2004 | Harada et al. | 307/10.3 |
| 2004/0207516 A1 * | 10/2004 | Ohtaki et al. | 340/438 |
| 2005/0034493 A1 * | 2/2005 | Wittwer et al. | 70/186 |
| 2006/0139146 A1 * | 6/2006 | Ito et al. | 340/5.31 |

FOREIGN PATENT DOCUMENTS

| | | | |
|---|---|---|---|
| JP | 2001-132289 A | 5/2001 |
| JP | 2002-295089 A | 10/2002 |

* cited by examiner

1

SLOT MECHANISM AND SMART IGNITION SYSTEM

BACKGROUND OF THE INVENTION

The present invention relates to a slot mechanism for a portable device (an electronic key) used in a vehicle such as an automobile, and to a smart ignition system. Specifically, the present invention relates to a slot mechanism that has a shutter for closing a slot when no object is inserted in the slot, and to a smart ignition system that has such a slot mechanism.

In recent years, engine start permitting mechanisms having a smart ignition function have been known in the art (for example, Japanese Laid-Open Patent Publication No. 2002-295089). Such an engine start permitting mechanism allows a user, who carries a portable device, to start the engine of a car by manipulating a switch on the car. This engine start permitting mechanism relieves the user of the chore of inserting a mechanical key portion of the portable device into the key cylinder.

An engine start permitting mechanism includes a portable device and a communication controller installed in a vehicle. The communication controller establishes mutual communication with the portable device, and checks an ID code transmitted from the portable device against an ID code of its own. When the ID codes match, the communication controller permits the engine to be started. The portable device has a battery as a power source enabling the mutual communication. When the battery is exhausted, the portable device is unable to transmit the ID code, and the communication controller is unable to permit the engine to be started. In such a case, the portable device is inserted into a slot provided in a instrument panel. Then, the communication controller transmits transponder driving radio waves to drive a transponder incorporated in the portable device, which generates a magnetic field in the slot. The magnetic field generates electromotive force at an immobilizer antenna of the transponder. The electromotive force activates the transponder, which, in turn, sends its own ID code to the communication controller. This enables the user to start the engine even if the battery of the portable device is exhausted. The slot mechanism of Japanese Laid-Open Patent Publication No. 2002-295089 has a shutter for closing the slot. The shutter is rotatably supported by a case.

SUMMARY OF THE INVENTION

Accordingly, it is an objective of the present invention to provide a new slot mechanism and smart ignition device.

To achieve the above-mentioned objective, the present invention provides a slot mechanism having an accommodation space into which an insertion object is inserted through a slot. The slot mechanism includes a shutter located in the accommodation space. The shutter is movable along an insertion direction of the insertion object. When the insertion object is inserted into the accommodation space, the shutter is pressed by the insertion object and moved toward the back of the accommodation space. When the insertion object is removed from the accommodation space, the shutter is moved toward the slot to close the slot.

Further, the present invention provides a smart ignition system including a portable device. A slot mechanism has an accommodation space into which the portable device is inserted through a slot. A detection portion detects insertion of the portable device into the accommodation space. A verification portion determines whether the inserted portable device is a correct portable device. The slot mechanism includes a shutter located in the accommodation space. The shutter is movable along an insertion direction of the portable device. When the portable device is inserted into the accommodation space, the shutter is pressed by the portable device and moved toward the back of the accommodation space. When the portable device is removed from the accommodation space, the shutter is moved toward the slot to close the slot.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
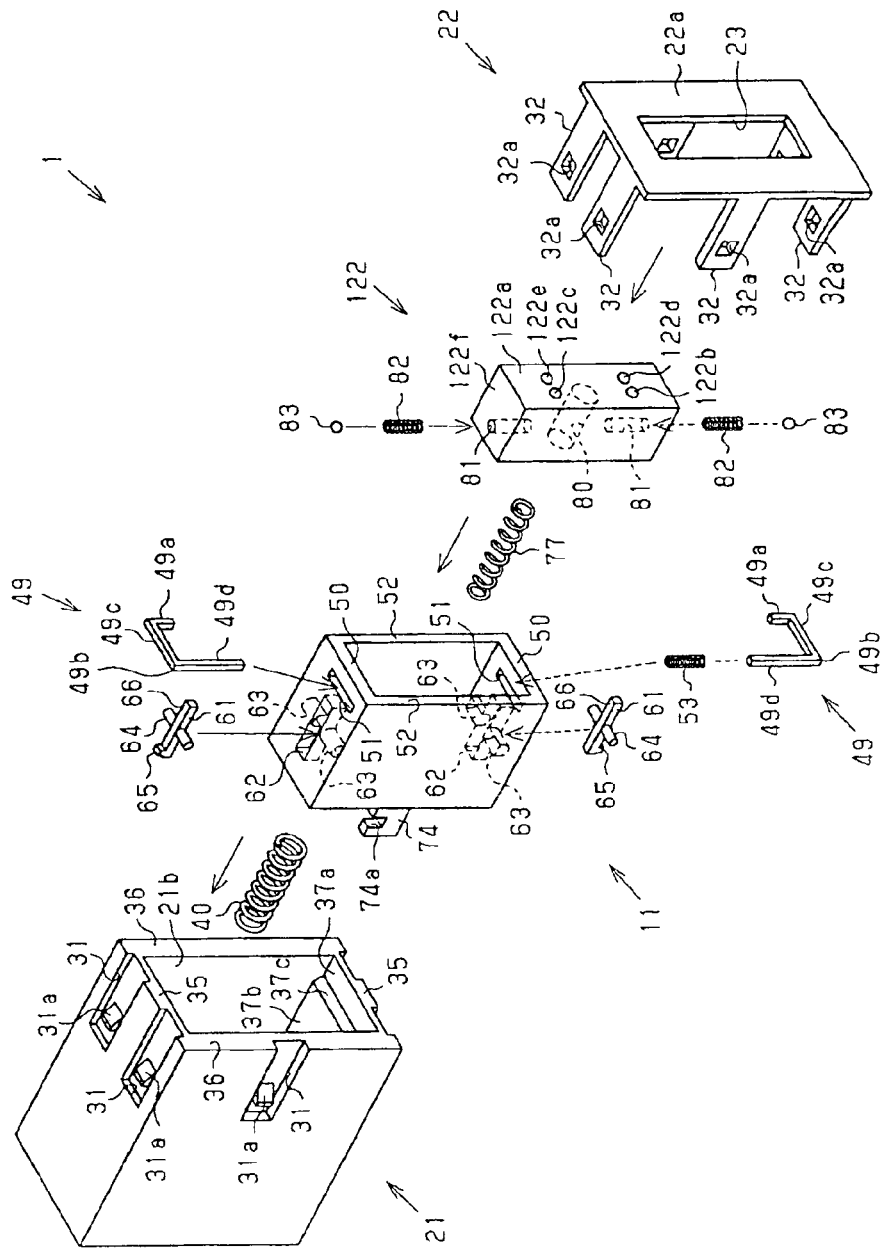
FIG. 1 is an exploded perspective view illustrating a slot mechanism according to one embodiment of the present invention.

In the drawings, like numerals are used for like elements throughout.

A preferred embodiment of the present invention will now be described. FIGS. 1 to 15 show the basic structure and operation of a slot mechanism 1 and a portable device 5. FIG. 2 and FIGS. 16 to 21 show contacting structure of a shutter 122 and the portable device 5, and modifications thereof. First, the contacting structure of the shutter 122 and the portable device 5 will be described with mainly reference to FIG. 2 and FIGS. 16 to 21. Thereafter, FIGS. 1 to 15 will be described.

Figure 2:
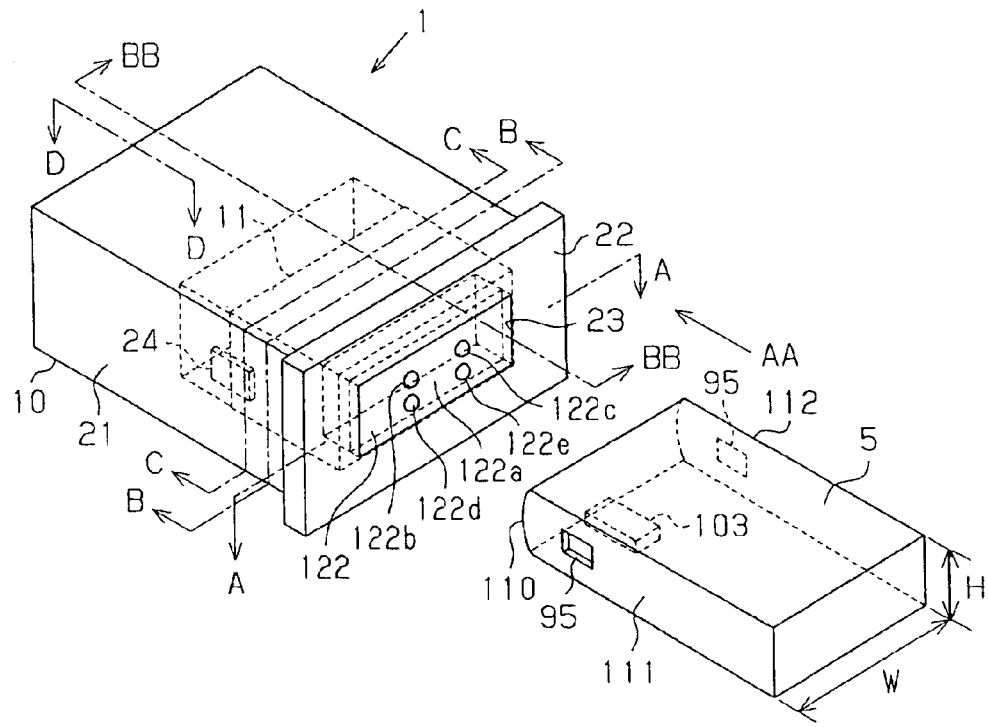
FIG. 2 is a perspective view illustrating the slot mechanism of FIG. 1 and a portable device key.
Figure 8:
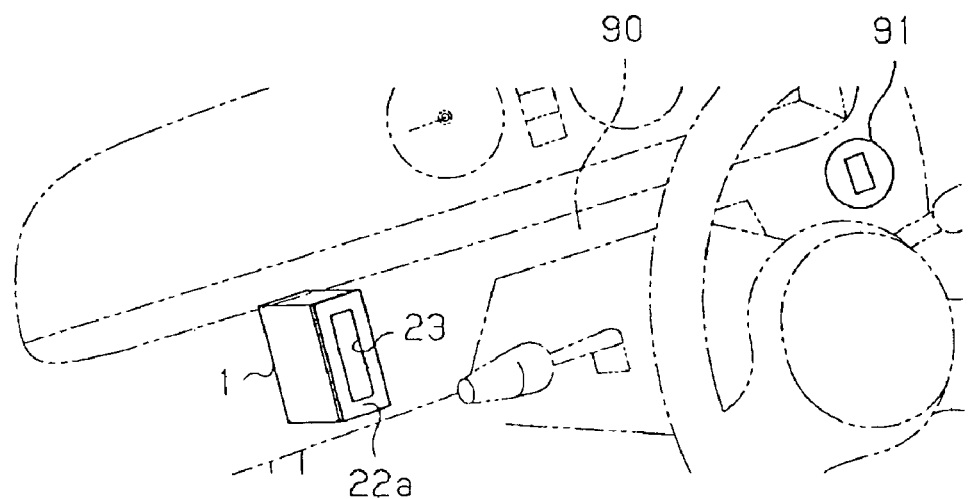
FIG. 8 is a diagrammatic view showing of an instrument panel in which the slot mechanism of FIG. 2 is installed.

As shown in FIG. 8, the slot mechanism 1 is provided in an instrument panel in a vehicle passenger compartment. When the battery of the portable device (electronic key) 5 is unexpectedly exhausted, a user inserts the portable device 5 into the slot mechanism 1 as shown in FIG. 2. Consequently, ID code verification is performed between the portable device 5 and the vehicle. The portable device 5 has a substantially rectangular parallelepiped, and slightly tapered with respect to the insertion direction to facilitate insertion into the slot mechanism 1. A insertion surface 110 that faces the slot mechanism 1 is formed arcuate. Side surfaces 111, 112 of the portable device 5, which are opposite to each other, are perpendicular to the insertion surface 110. A locking recess 95 is formed in each of the side surfaces 111, 112. The locking recesses 95 are formed slightly larger than locking pieces 49 (see FIG. 17) of the slot mechanism 1, which will be discussed below. The portable device 5 accommodates a transponder 103.

Figure 16:
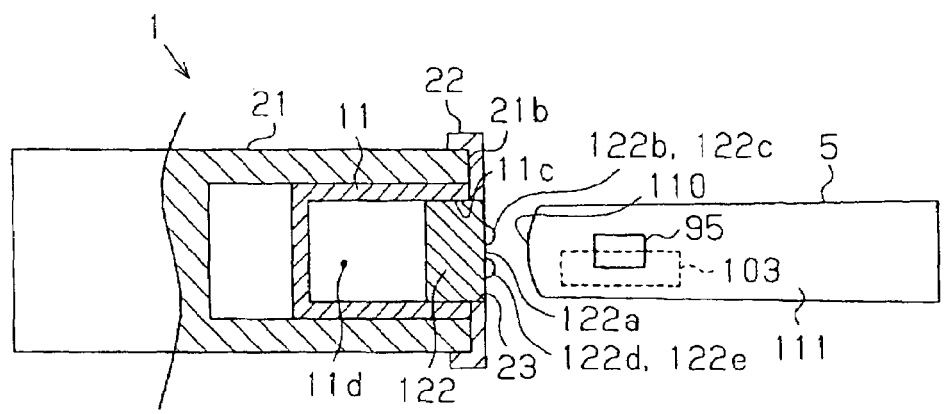
FIG. 16 is a cross-sectional view taken along line BB-BB of FIG. 2, illustrating the slot before the portable device is inserted.

As shown in FIGS. 2 and 16, the slot mechanism 1 includes a case main body 21, a shutter holder 11 accommodated in the case main body 21, the shutter 122 accommodated in the shutter holder 11, a panel portion 22 attached to a surface of the case main body 21 through which the portable device 5 is inserted, and an immobilizer antenna 24 incorporated in the case main body 21. The immobilizer antenna 24 communicates with the transponder 103 of the portable device 5. The immobilizer antenna 24 is arranged to be close to the transponder 103 when the portable device 5 is inserted into the slot mechanism 1. Specifically, the immobilizer antenna 24 is arranged to face the side surface 111 of the portable device 5 in a state where the portable device 5 is inserted into the slot mechanism 1.

The case main body 21 has a rectangular cross-section with a bottom. The case main body 21 has an open end at a side through which the portable device 5 is inserted. The case main body 21 accommodates the shutter holder 11 while allowing the shutter holder 11 to reciprocate in the case main body 21.

Figure 17:
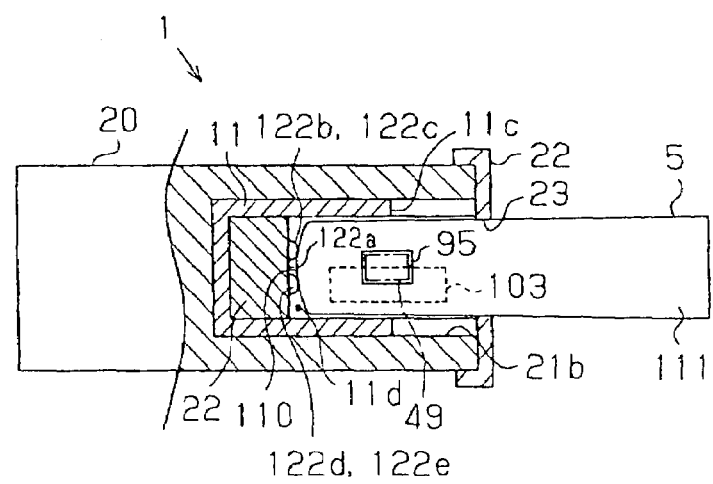
FIG. 17 is a cross-sectional view taken along line BB-BB of FIG. 2, illustrating the slot in which the portable device is fixed.

The shutter holder 11 has a portable device accommodation opening 11c. Also, an accommodation space 11d is defined in the shutter holder 11. The portable device 5 is inserted into the accommodation space 11d. As shown in FIG. 17, locking pieces 49 are provided on the inner surface of the shutter holder 11. The locking pieces 49 selectively project as the shutter holder 11 is moved. When the portable device 5 is inserted to the back of the accommodation space 11d, the antenna 24 is located in part of the case main body 21 that is close to the transponder 103.

The shutter holder 11 accommodates the shutter 122. The shutter 122 is shaped as a rectangular parallelepiped and reciprocated in the shutter holder 11.

Figure 4:
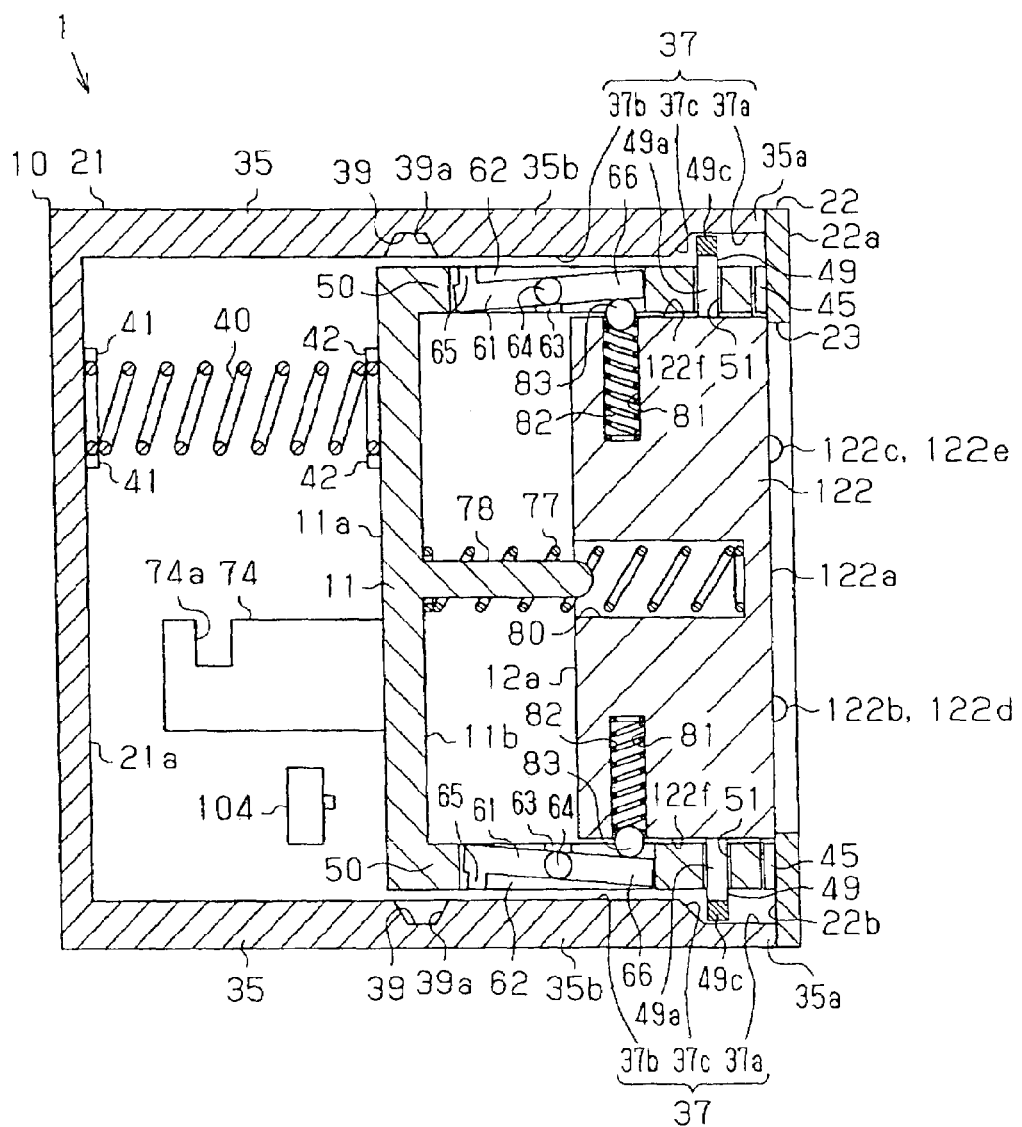
FIG. 4 is a cross-sectional view of the slot mechanism shown in FIG. 2 taken along line A-A.

As shown in FIG. 4, a spring 77 is located between the inner bottom surface of the shutter holder 11 and the shutter 122. The force of the spring 77 constantly urges the shutter 122 in a direction closing a portable device insertion slot 23 (rightward as viewed in FIGS. 4 and 16). Therefore, when the portable device 5 is not inserted, the shutter 122 closes the slot 23 so that dust cannot enter the interior of the slot mechanism 1.

Figure 18A:
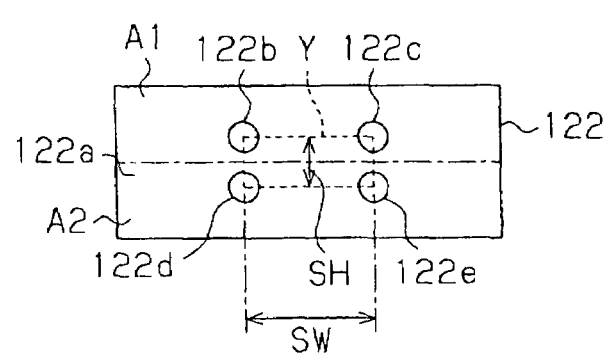
FIG. 18(a) is a view illustrating the shutter as viewed in the direction of arrow AA in FIG. 2.
Figure 18B:
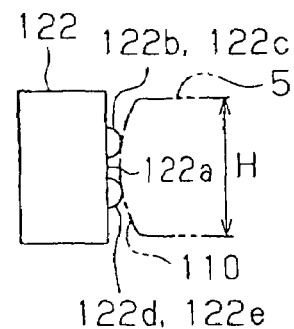
FIG. 18(b) is a side view illustrating the shutter.

As shown in FIGS. 18(a) and 18(b), four semispherical projections 122b, 122c, 122d, and 122e are located on a surface 122a of the shutter 122 facing the portable device 5. In other words, the shutter 122 has a shutter surface 122a that faces the portable device 5 inserted into the slot 23. The shutter surface 122a has projections 122b, 122c, 122d, and 122e. The semispherical projections 122b, 122c, 122d, and 122e are formed of the same material as the shutter 122 and integrated with the shutter 122. The projections 122b, 122c, 122d, 122e correspond to a reducing structure that reduces a contact area between the portable device 5 and the shutter 122.

The arrangement and the heights of the projections 122b, 122c, 122d, 122e are determined such that, when the portable device 5 is inserted into the slot mechanism as shown in FIGS. 17 and 18(b) and the projections 122b, 122c, 122d, 122e contact the insertion surface 110 of the portable device 5, the insertion surface 110 of the portable device 5 does not contact the surface 122a of the shutter 122.

Specifically, the surface 122a of the shutter 122 is divided into two regions A1, A2 as shown in FIG. 18(a), each of which corresponds to a half of the insertion surface 110 of the portable device 5. In one of the regions A1, A2, specifically in the region A1 (the upper half of the surface 122a as viewed in FIG. 18(a)), the projections 122b and 122c are formed. In the other region A2 (the lower half of the surface 122a as viewed in FIG. 18(a)), the projections 122d and 122e are formed. Also, the projections 122b, 122c, 122d, 122e are located at the corners of a rectangle Y, which is substantially similar to the contour of the insertion surface 110 of the portable device 5. The distance SH between the projections 122b and 122d and the distance SH between the projections 122c and 122e are each determined to be one third of the thickness H of the portable device 5. The distance SW between the projections 122b and 122c and the distance SW between the projections 122d and 122e are each determined to be one third of the width W (see FIG. 2) of the portable device 5.

The panel portion 22 is attached to the end of the case main body 21 at a case opening 21b from the outside. The slot 23 (opening), through which the portable device 5 is inserted, is formed in the panel portion 22. In this embodiment, the opening area of the slot 23 is substantially the same as that of the portable device accommodation opening 11c.

Operations of slot mechanism constructed as above will now be described with reference to FIG. 17.

When the portable device 5 is inserted into the slot mechanism 1, the insertion surface 110 of the portable device 5 contacts the projections 122b, 122c, 122d, and 122e. That is, the insertion surface 110 of the portable device 5 does not contact the surface 122a of the shutter 122. Therefore, at the insertion of the portable device 5 into the slot mechanism 1, the surface 122a of the shutter 122 is prevented from being scratched.

When the portable device 5 is inserted into the slot mechanism 1, the insertion surface 110 of the portable device 5 contacts the projections 122b, 122c, 122d, and 122e in a balanced manner. Specifically, the corners of the insertion surface 110 of the portable device 5 are located inside of the rectangle defined by the projections 122b, 122c, 122d, 122e (the rectangle that is substantially similar to the contour of the insertion surface 110). Therefore, the attitude of the portable device 5 is stabilized when being inserted.

When the portable device 5 is inserted with the insertion surface 110 of the portable device 5 contacting the projections 122b, 122c, 122d, 122e, the shutter 122 is moved in the insertion direction of the portable device 5 (leftward as viewed in FIG. 17) against the force of the spring 77 (see FIG. 10) as the portable device 5 is moved. The contact between the shutter 122 and the inner bottom surface of the shutter holder 11 limits movement of the shutter 122 in the shutter holder 11 along the insertion direction of the portable device 5. As a result, part of the portable device 5 is accommodated in the accommodation space 11d.

In this state, further insertion of the portable device 5 causes the shutter 122 to move integrally with the shutter holder 11 in the insertion direction of the portable device 5. When the portable device 5 is inserted further, the locking pieces 49 of the shutter holder 11 project inward with respect to the shutter holder 11 and engage with the locking recesses 95, thereby holding the side surfaces 111, 112 of the portable device 5 (see FIG. 11). The shutter holder 11 has locking claws 65. The locking claws 65 are engaged with engaging recesses 39 formed in the case main body 21. Consequently, the portable device 5 is secured in the slot mechanism 1 as shown in FIG. 17.

When the portable device 5 is secured in the slot mechanism 1, radio waves outputted from the immobilizer antenna 24 generate a magnetic field in the accommodation space 11d of the shutter holder 11. The magnetic field activates the transponder 103 of the portable device 5, so that the transponder 103 transmits its own ID code to the vehicle.

Accordingly, the present embodiment provides the following advantages.

(1) The slot mechanism 1 has the shutter 122, which slides in the insertion direction of the portable device 5. Therefore, in a state where an insertion body, such as the portable device 5 being a rectangular parallelepiped, is not inserted in the slot mechanism 1, the shutter 122 prevents foreign matter from entering the slot mechanism 1.

(2) When the portable device 5 is inserted into the slot mechanism 1, the insertion surface 110 of the portable device 5 contacts the four projections 122b, 122c, 122d, and 122e of the shutter 122. The projections 122b, 122c, 122d, 122e therefore reduce the contact area between the shutter 122 and the portable device 5 compared to a case where no projections like the projections 122b, 122c, 122d, 122e are provided on the surface 122a of the shutter 122. Therefore, at the insertion of the portable device 5, the surface 122a of the shutter 122 is prevented from being scratched. The appearance of the shutter 122 is thus maintained.

When the portable device 5 is inserted into the slot mechanism 1, the surface (distal end) of each projection 122b, 122c, 122d, 122e may be scratched by contact with the portable device 5. However, the scratches on the distal ends of the projections 122b, 122c, 122d, 122e are hardly visible to the user. This is because the contact area between the projections 122b, 122c, 122d, 122e and the insertion surface 110 of the portable device 5 is minute. The appearance of the surface 122a of the shutter 122 is thus maintained.

(3) The shutter 122 is always urged in the direction closing the slot 23 by the spring 77. Therefore, when the portable device 5 is inserted into the slot mechanism 1, the projections 122b, 122c, 122d, 122e closely contact the arcuate insertion surface 110. This stabilizes the attitude of the portable device 5 when being inserted into the slot mechanism 1. Therefore, the portable device 5 is easily inserted into the slot mechanism 1. The projections 122b, 122c, 122d, 122e function as a guiding portion that stabilizes the attitude of the portable device 5 when the portable device 5 is pressed against the shutter 122.

(4) Among the four projections 122b, 122c, 122d, 122e, the projections 122b, 122c are formed in the region occupying the upper half (FIG. 18(*a*)) of the surface 122a, and the projections 122d and 122e are formed in the region occupying the lower half (FIG. 18(*a*)) of the surface 122a. Thus, when the portable device 5 is inserted into the slot mechanism 1, the upper half of the insertion surface 110 of the portable device 5 contacts the projections 122b and 122c, while the lower half contacts the projections 122d and 122e. This stabilizes the attitude of the portable device 5. Further, at the insertion of the portable device 5 into the slot mechanism 1, the portable device 5 is prevented from being inclined, which prevents the surface 122a of the shutter 122 from being scratched.

(5) The projections 122b, 122c, 122d, 122e are located at the corners of the rectangle Y, which is substantially similar to the contour of the insertion surface 110 of the portable device 5. That is, the projections 122b, 122c, 122d, 122e are provided at positions each corresponding to one of the corners of the insertion surface 110 of the portable device 5. Therefore, when the portable device 5 is inserted in the slot mechanism 1, the portable device 5 is further reliably prevented from being inclined. This reliably forms a space between the surface 122a of the shutter 122 and the insertion surface 110. The surface 122a of the shutter 122 is further reliably prevented from being scratched.

(6) When the portable device 5 is secured in the slot mechanism 1, a top of the insertion surface 110 is located inside the projections 122b, 122c and the projections 122d, 122e on the surface 122a of the shutter 122. The position of the portable device 5 is stably maintained in the slot mechanism 1. That is, the portable device 5 is centered in the slot mechanism 1 by the projections 122b, 122c, 122d, 122e of the shutter 122. Therefore, when inserted into the slot mechanism 1, the portable device 5 is secured by the four projections 122b, 122c, 122d, 122e and the locking pieces 49. Thus, compared to a case where projections like the projections 122b, 122c, 122d, 122e are not formed on the surface 122a of the shutter 122, noise generated due to chattering of the portable device 5 while the vehicle is driving is suppressed.

Also, since the attitude of the portable device 5 is stabilized when the portable device 5 is inserted in the slot mechanism 1, the distance between the immobilizer antenna 24 and the transponder 103 is maintained constant. Therefore, the verification of the ID codes is reliably performed between the immobilizer antenna 24 and the transponder 103. Therefore, the reliability of the ID code verification between the slot mechanism 1 and the portable device 5 is improved.

(7) The shutter 122 and the projections 122b, 122c, 122d, 122e are formed of the same material. Thus, compared to a case where the shutter 122 and the projections 122b, 122c, 122d, 122e are manufactured separately, the manufacturing cost of the slot mechanism 1 is reduced. Also, the configuration reduces the number of the components.

(8) The projections 122b, 122c, 122d, 122e are formed to have semispherical shapes. Thus, the projections 122b, 122c, 122d, 122e each contact the insertion surface 110 at a point.

Therefore, even if the surface (distal end) of each projection 122b, 122c, 122d, 122e is scratched by contact with the portable device 5, the scratches are hardly visible to the user. The appearance of the surface 122a of the shutter 122 is thus maintained.

The above-mentioned embodiment may be embodied in the following forms.

Figure 19A:
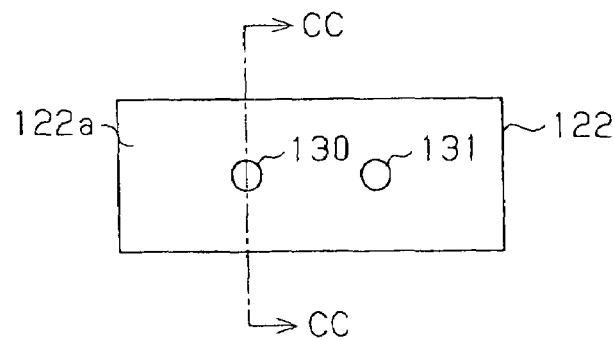
FIG. 19(a) is a front view illustrating a shutter according to another embodiment.
Figure 19B:
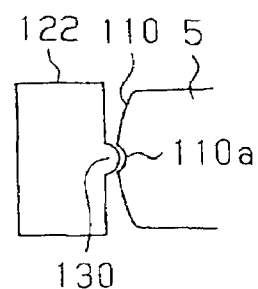
FIG. 19(b) is a cross-sectional view taken along line CC-CC of FIG. 19(a)

In the above illustrated embodiment, the four projections 122b, 122c, 122d, 122e are formed on the surface 122a of the shutter 122. However, the number of projections formed on the surface 122a of the shutter 122 is not limited to four. For example, as shown in FIG. 19(a), two projections 130, 131 made of the same material as that of the shutter 122 may be integrally formed on the surface 122a of the shutter 122. In this case, as shown in FIG. 19(b), an engaging groove 110a may be formed on the insertion surface 110 of the portable device 5. The engaging groove 110a is engaged with the projections 130, 131. Alternatively, there may be two separate engaging grooves 110a may be formed, each of which corresponds to one of the projections 130, 131. These configurations permit the projections 130, 131 to be engaged with the engaging groove or grooves 11a when the portable device 5 is inserted into the slot mechanism 1, which limits the movement of the portable device 5. Therefore, insertion of the portable device 5 into the slot mechanism 1 is facilitated.

Figure 20A:
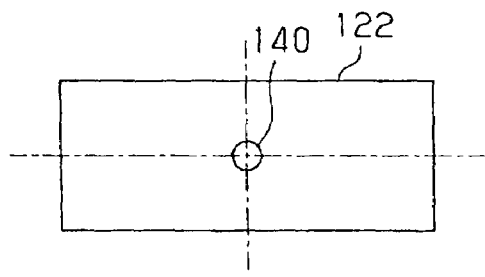
FIG. 20(a) is a front view illustrating a shutter according to another embodiment.

Further, as shown in FIG. 20(a), one projection 140 may be formed on the surface 122a of the shutter 122. Alternatively, three projections (not shown) may be formed on the surface 122a. These configurations also reduce the contact area between the shutter 122 and the insertion surface 110 of the portable device 5.

Figure 20B:
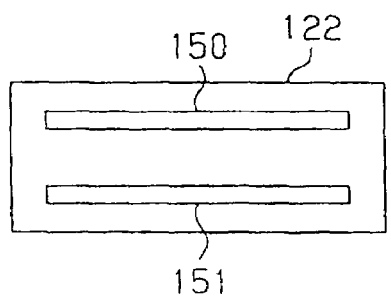
FIG. 20(b) is a front view illustrating a shutter according to a further embodiment.

In the embodiment of FIGS. 1 to 18(b), the projections 122b, 122c, 122d, 122e are formed to have semispherical shapes. However, the shape of the projections 122b, 122c, 122d, 122e is not limited to semispherical. For example, the projections 122b, 122c, 122d, 122e may be formed cylindrical. Also, as shown in FIG. 20(b), semicylindrical linear projections 150, 151 may be formed on the surface 122a of the shutter 122 with a predetermined space in between in a direction perpendicular to the longitudinal direction of the surface 122a.

Figure 20C:
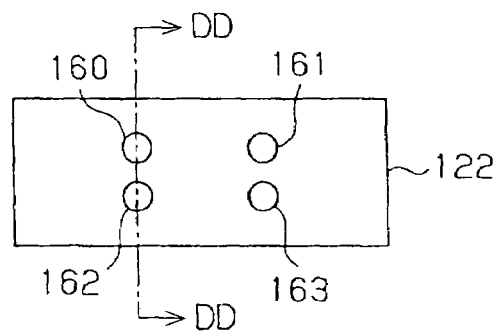
FIG. 20(c) is a front view illustrating a shutter according to another embodiment.
Figure 20D:
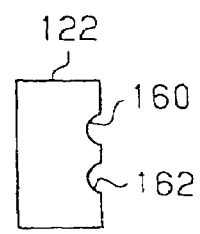
FIG. 20(d) is a cross-sectional view taken along line DD-DD in FIG. 20(c)

Further, as shown in FIGS. 20(c) and 20(d), Hemispherical recesses 160, 161, 162, and 163 may be formed on the surface 122a of the shutter 122. The recesses 160, 161, 162, 163 correspond to a contact area reducing structure. In this case also, the contact area between the insertion surface 110 of the portable device 5 and the surface 122a of the shutter 122 is reduced, and the surface 122a is prevented from being scratched. In a case where the insertion surface 110 of the portable device 5 is formed arcuate, the recesses 160, 161, 162, 163 are located in a center portion of the surface 122a of the shutter 122 (positions corresponding a top of the insertion surface 110 of the portable device 5).

In the embodiment of FIGS. 1 to 18(b), the projections 122b, 122c, 122d, 122e are formed integrally with the shutter 122. However, the projections 122b, 122c, 122d, 122e may be formed separately from the shutter 122. Further, the projections 122b, 122c, 122d, 122e may be formed of an elastic material such as rubber. This configuration prevents the insertion surface 110 of the portable device 5 from being scratched when the portable device 5 is inserted into the slot mechanism 1. The projections 122b, 122c, 122d, 122e may be formed of metal such as steel. This reduces the abrasion of the projections 122b, 122c, 122d, 122e caused by contact with the insertion surface 110 of the portable device 5 is reduced.

In the embodiment of FIGS. 1 to 18(b), the surface 122a of the shutter 122 is divided into the two regions A1 and A2, each corresponding to a half of the insertion surface 110 of the portable device 5. That is, the surface 122a is divided into the upper half region and the lower half region as viewed in FIG. 18(a), in each of which projections are formed. However, the surface 122a of the shutter 122 may be divided into regions other than the upper and lower regions in the embodiment of FIGS. 1 to 18(a). For example, the surface 122a of the shutter 122 may be divided by a diagonal line of the surface 122a. Alternatively, the surface 122a may be divided into a left half and a right half as viewed in FIG. 18(a).

Figure 21:
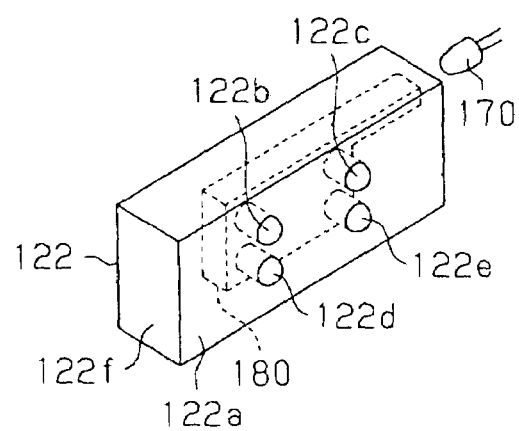
FIG. 21 is a perspective view illustrating another embodiment of the present invention.

The projections 122b, 122c, 122d, 122e may be configured to emit light. For example, as shown in FIG. 21, an LED 170 functioning as a light source may be provided, and the projections 122b, 122c, 122d, 122e may receive and emit light from the LED 170. The LED 170 is attached to the case main body 21. An optical waveguide 180, which is substantially shaped like a rectangular parallelepiped, is embedded in the shutter 122 to guide light generated by the LED 170 to the projections 122b, 122c, 122d, 122e. The optical waveguide 180 is made of a material that permits light to pass through. The optical waveguide 180 and the projections 122b, 122c, 122d, 122e are formed integrally of a transparent resin. A through hole (not shown) is formed in the shutter holder 11 to guide light generated by the LED 170 to the optical waveguide 180.

Therefore, when the LED generates light in a state where the shutter 122 closes the slot 23, the projections 122b, 122c, 122d, 122e are caused to emit light in the shutter 122, which is formed of black resin. This allows the user to easily find the slot mechanism 1. Also, when inserting the portable device 5 into the slot mechanism 1, the user can easily find a section of the shutter 122 against which the portable device 5 should be pressed.

Hereinafter, the structure and operation of the slot mechanism 1 will be described, while particularly focusing on the shutter holder 11 and a holder locking mechanism for locking the shutter holder 11.

As shown in FIG. 2, a portable device (electronic key) 5 is inserted into the slot mechanism 1. The portable device 5 is held by a case 10 of the slot mechanism 1.

As shown in FIGS. 1 to 4, the slot mechanism 1 includes the case 10, the shutter holder 11, and the shutter 122.

The case 10 includes a case main body 21 and a panel portion 22. The panel portion 22 is attached to an opening of the case main body 21. The case 10 is shaped like a box.

The case main body 21 has a rectangular cross-section and a closed end. Recesses 31 are formed in the outer walls of the case main body 21. The recesses 31 extend from the open end of the case main body 21 toward the bottom of the case main body 21. A projection 31a is formed on the bottom of each recess 31. The panel portion 22 is rectangular. Engaging plates 32 are provided on the edges of the panel portion 22. Each engaging plate 32 corresponds to one of the recesses 31. The engaging plates 32 are used for attaching the panel portion 22 to the case main body 21.

A through hole 32a is formed in each engaging plate 32. The recesses 31 of the case main body 21 receive the engaging plates 32 of the panel portion 22, and the projections 31a of the recesses 31 are engaged with the through holes 32a. Accordingly, the panel portion 22 is attached to the case main body 21 to close the opening of the case main body 21. In FIG. 2, the recesses 31 and the engaging plates 32 are omitted for purposes of illustration.

The panel portion 22 has a front side 22a and a back side 22b. The front side 22a forms a part of the surface of the case 10. The back side 22b is opposite from the front side 22a. The slot 23 is formed in the front side 22a. The slot 23 communicates with the interior of the case 10, or the interior of the case main body 21 (accommodation space). The slot 23 is located in a center of the front side 22a and extends along the longitudinal direction of the front side 22a (vertically as viewed in the drawing).

The cross-sectional shape of the slot 23 is substantially the same as a cross-section of the portable device 5 along a direction perpendicular to the insertion direction of the portable device 5. In this embodiment, the cross-sectional shape of the portable device 5 is rectangular. Hereinafter, the insertion direction of the portable device 5 will be referred to as depth direction.

Figure 3:
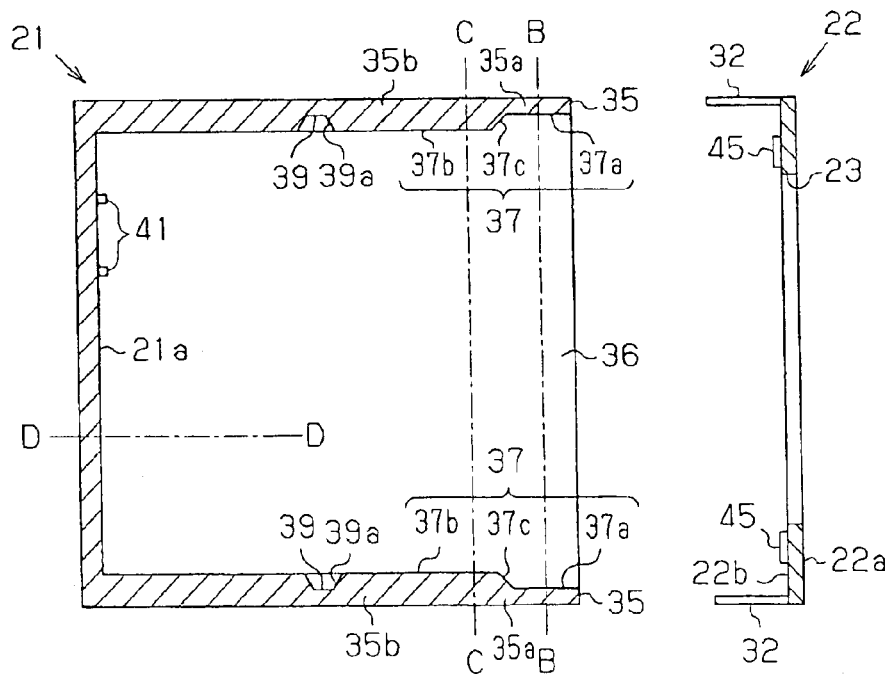
FIG. 3 is a cross-sectional view of the case main body and a panel portion shown in FIG. 2 taken along line A-A.

As shown in FIG. 3, the case main body 21 has a pair of sidewalls (herein after referred to as operational walls 35). The operational walls 35 contact the lateral sides of the back side 22b of the panel portion 22. Each operational wall 35 has a thin portion 35a next to the opening of the case main body 21. Each thin portion 35a is formed by removing part of the corresponding operational wall 35 from inside. Hereinafter, an inside section of each operational wall 35 of the case main body 21 will be referred to as a thick portion 35b. Among the sidewalls of the case main body 21, the sidewalls perpendicular to the operational walls 35, or the sidewalks contacting the longitudinal edges of the back side 22b, will be referred to as structural walls 36.

The thickness of each operational wall 35 gradually increases from the thin portion 35a to the thick portion 35b. That is, inner surface of each operational wall 35 (operational surface 37) is formed of the inner surface of the thin portion 35a (thin surface 37a), the inner surface of the thick portion (thick surface 37b), and an inclined surface 37c coupling the thin surface 37a and the thick surface 37b. Each engaging recess 39 is formed in one of the thick surfaces 37b.

The radius of each engaging recess 39 gradually decreases from the open end to the bottom. An inclined surface (slope) 39a is formed between the bottom of each engaging recess 39 and the corresponding operational surface 37.

As shown in FIG. 4, a shutter holder 11 is located in the interior of the case 10. The shutter holder 11 has a rectangular cross-section and a closed end. The opening of the shutter holder 11 faces the same direction as the opening of the case main body 21. The outer shape of the vertical cross-section of the sidewalls of the shutter holder 11 is substantially the same as the inner shape of the cross-section of the case main body 21 at a portion corresponding to the thick portions 35b. The shutter holder 11 is slidable along the depth direction in the case main body 21 along the operational surfaces 37.

An elastic member (holder urging member) for urging the shutter holder 11 is located between the inner surface 21a of the bottom of the case main body 21 and the outer surface 11a of the shutter holder 11. In this embodiment, the elastic member is a holder coil spring 40. One end of the holder coil spring 40 is engaged with a spring seat 41 provided on the bottom inner surface 21a of the case main body 21. The other end of the spring 40 is engaged with a spring seat 42 formed on the bottom outer surface 11a of the shutter holder 11. The shutter holder 11 is always urged toward the slot 23 by the force of the holder coil spring 40. When no object (portable device 5 or a finger) is inserted in the slot 23 of the slot mechanism 1, the opening of the shutter holder 11 contacts stoppers 45 provided on the back side 22b. When contacting the stopper 45, the shutter holder 11 is at a first position.

Figure 5:
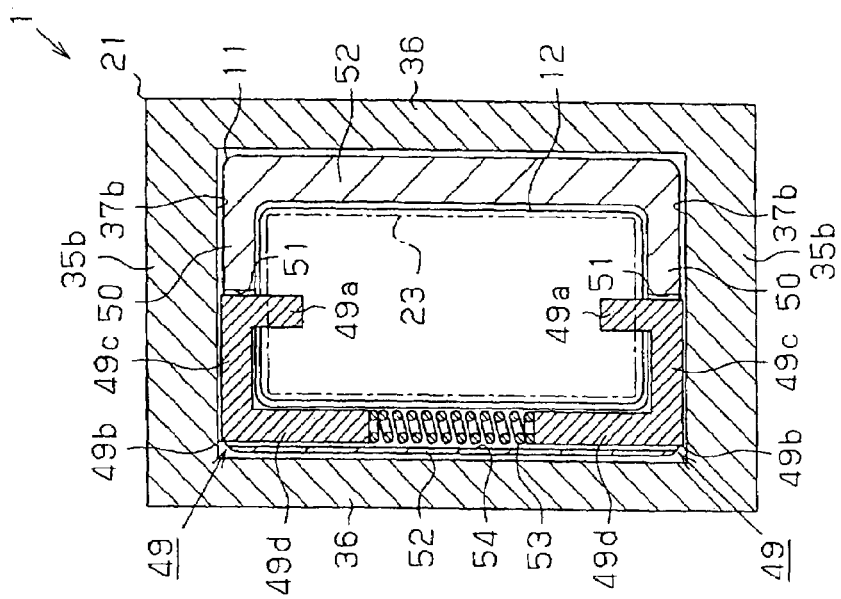
FIG. 5 is a cross-sectional view of the slot mechanism shown in FIG. 2 taken along line B-B.
Figure 6:
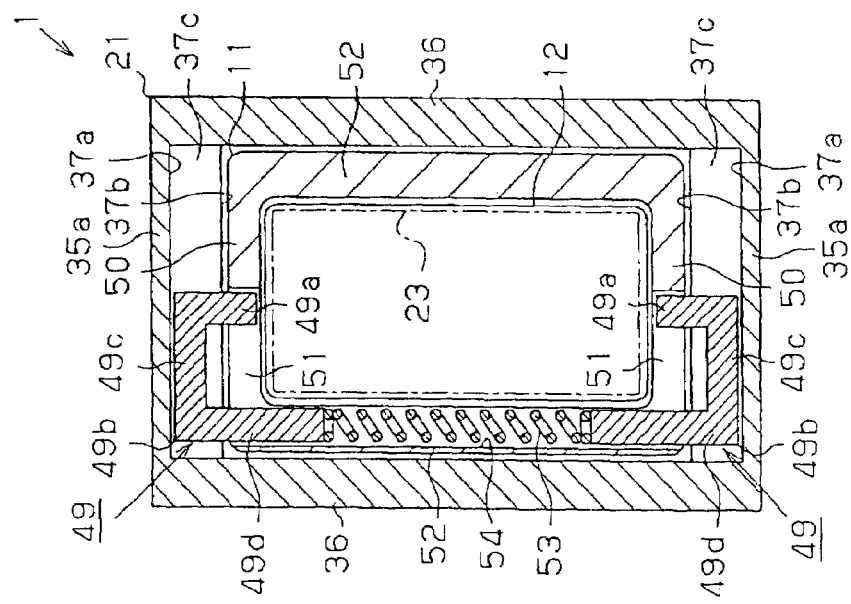
FIG. 6 is a cross-sectional view of the slot mechanism shown in FIG. 2 taken along line C-C.

As shown in FIGS. 1, 5, and 6, the shutter holder 11 has a pair of locking pieces 49. The locking pieces 49 form a portable device locking mechanism (inserted body locking mechanism) for locking the portable device 5 to the shutter holder 11. Among the sidewalls of the shutter holder 11, a pair of the sidewalls facing the operational surfaces 37 of the case main body 21 will be referred to as functional walls 50. Each functional wall 50 has a through hole for receiving the corresponding locking piece 49, or a locking piece hole 51. Each locking piece 49 is located in the corresponding locking piece hole 51.

The locking piece holes 51 are located in the vicinity of the opening of the shutter holder 11. A pair of the sidewalls of the shutter holder 11 facing the structural walls 36 of the case main body 21 will be referred to as operational walls 52. Each locking piece hole 51 extends toward one of the operational walls 52 (left one as viewed in the drawing) from a vicinity of a center line that divides the corresponding functional wall 50 into equal halves. A groove 54 is formed in an inner surface of the operational wall 52 toward which the locking piece holes 51 extend. The groove 54 is integral with the locking piece holes 51. The groove 54 is omitted in FIG. 1.

Each locking piece 49 includes a locking portion 49a and an L-shaped arm portion 49b. The arm portion 49b includes a long portion 49d extending along the groove 54 and a short portion 49c. The short portions 49c extend from upper and lower ends of the long portion 49d along the locking piece holes 51. The locking portion 49a is connected to an end of the short portion 49c that is opposite from the end to which the long portion 49d is attached. The locking portion 49a extends parallel to the long portion 49d. The locking portion 49a and the long portion 49d extend from the short portion 49c in the same direction. The length of each locking portion 49a is substantially equal to a value obtained by subtracting the thickness of the thin portion 35a from the sum of the thickness of the functional wall 50 of the shutter holder 11 and the thickness of the thick portion 35b of the operational wall 35 of the case main body 21.

The long portion 49d of the arm portion 49b of each locking piece 49 is loosely fitted in the corresponding locking piece hole 51 along the groove 54. The short portion 49c is loosely fitted in the corresponding locking piece hole 51 along the longitudinal direction of the locking piece hole 51. A locking coil spring 53 is located between the free ends of the long portions 49d of the locking pieces 49. The locking coil spring 53 contacts the free ends of the long portions 49d.

The locking pieces 49 are always urged by the force of the locking coil spring 53 such that the short portions 49c protrude from the locking piece holes 51 to the outside of the shutter holder 11. Thus, the short portions 49c always contact the operational surfaces 37 of the case main body 21. When no object is inserted in the insertion slot 23, the short portions 49c of the arm portions 49b contact the thin surfaces 37a.

As shown in FIGS. 1 and 4, the shutter holder 11 has a pair of tactile feedback pieces 61. The tactile feedback pieces 61 function as engaging members that form a holder retaining mechanism for retaining the shutter holder 11 in the case main body 21. A retaining hole 62 for retaining the tactile feedback piece 61 is formed in each functional wall 50 of the shutter holder 11. Each retaining hole 62 extends through the corresponding functional wall 50 to connect the outside of the shutter holder 11 with the inside. Each tactile feedback piece 61 is provided in the corresponding retaining hole 62.

Specifically, each retaining hole 62 is located in the center of the corresponding functional wall 50. Each retaining hole 62 is thin and extends along the depth direction of the shutter holder 11. Each tactile feedback piece 61 has a pivot (rotary shaft) 64 integrally formed with the tactile feedback piece 61. The tactile feedback piece 61 and the pivot 64 form a cross. Recesses 63 are formed in the inner surfaces of the functional walls 50 to rotatably receive the pivot 64. Each recess 63 extends transversely relative to a center portion of the corresponding retaining hole 62. Each tactile feedback piece 61 is located along the longitudinal direction of the corresponding retaining hole 62 and rotates about the pivot 64. On an end of each tactile feedback piece 61 corresponding to the bottom of the shutter holder 11, one of the locking claws 65 projects to the corresponding operational surface 37 of the case main body 21. When the shutter holder 11 is at a second position, the locking claws 65 can enter the engaging recesses 39.

The shutter holder 11 includes a holder locking member, which is a locking arm 74. The locking arm 74 forms a holder locking mechanism. As shown in FIG. 4, the locking arm 74 protrudes from the bottom outer surface 11a of the shutter holder 11 toward the bottom inner surface 21a of the case main body 21. A engaging portion is formed near the distal end of the locking arm 74. The engaging portion is a notch 74a in this embodiment.

Figure 7:
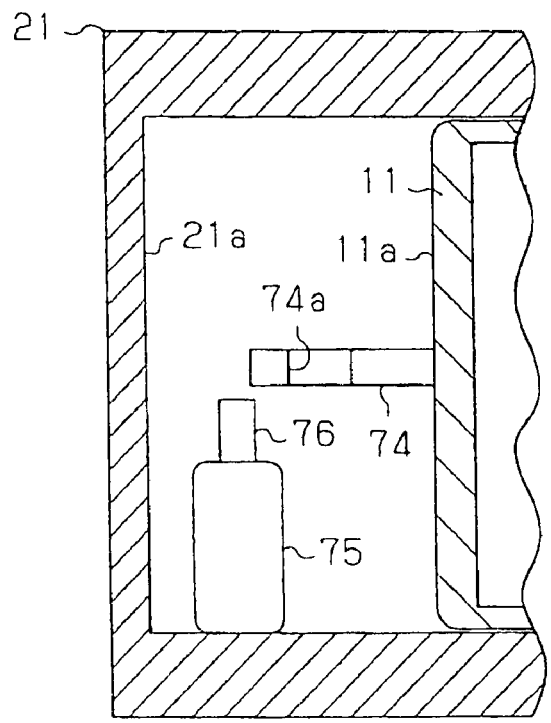
FIG. 7 is a partial cross-sectional view of the slot mechanism shown in FIG. 2 taken along line D-D.

As shown in FIG. 7, the case main body 21 has a solenoid 75 located in the vicinity of the bottom inner surface 21a. The solenoid 75 has a plunger 76 that moves along a direction perpendicular to the locking arm 74. The solenoid 75 is activated when receiving electricity. When the electricity is applied to the solenoid, the plunger 76 is projected. When the applied electricity is turned off, the plunger 76 is retracted.

As shown in FIGS. 1 and 4, the shutter 122 is located in the interior of the shutter holder 11. The shutter 122 has a substantially rectangular cross-section. With respect to the depth direction, the vertical cross-cross section is substantially the same as the inner shape of the cross-section of the shutter holder 11. The shutter 122 is slidable along the depth direction in the interior of the shutter holder 11 along the inner surface of the shutter holder 11. When a surface 122a of the shutter 122 that faces the slot 23 is at the opening of the shutter holder 11 or closer to the slot 23 with respect to the depth direction, the shutter 122 is located at a third position. When contacting bottom inner surface 11b of the shutter holder 11, the shutter 122 is located at a fourth position. The shutter 122 moves relative to the shutter holder 11 between the third position and the fourth position.

The shutter coil spring 77 is located between the bottom inner surface 11b of the shutter holder 11 and the shutter 122. The spring 77 functions a shutter urging member. A substantially cylindrical guide pin 78 is provided in the center of the bottom inner surface 11b of the shutter holder 11. The guide pin 78 extends toward the slot 23. One end of the shutter coil spring 77 is loosely fitted to the guide pin 78, and contacts the bottom inner surface 11b.

The surface 12a of the shutter 122 faces the bottom inner surface 11b of the shutter holder 11. A guide hole 80 is formed in the center of the surface 12a. The other end of the shutter coil spring 77 contacts the bottom of the guide hole 80. The shutter 122 is always urged toward the slot 23 by the force of the shutter coil spring 77. When no object is inserted in the slot 23, the surface 122a of the shutter 122 at the side facing the slot 23 contacts the back side 22b of the panel portion 22. That is, the slot 23 is closed.

The spring constant of the shutter coil spring 77 is sufficiently lower than the spring constant of the holder coil spring 40. Therefore, if the magnitude of compression force acting on the shutter coil spring 77 is equal to the magnitude of compression force acting on the holder coil spring 40, the shutter coil spring 77 is contracted by a greater degree than the holder coil spring 40.

On a pair of surfaces 122f of the shutter 122 that each face one of the functional walls 50 of the shutter holder 11, an accommodation hole 81 is formed. In each accommodation hole 81, a pressing member, which is a tactile feedback coil spring 82, and a tactile feedback ball 83 are provided. The tactile feedback ball 83 is selectively protruded from and retracted in the accommodation hole 81. One end of each tactile feedback coil spring 82 contacts the bottom of the corresponding accommodation hole 81. The other end of the tactile feedback coil spring 82 contacts the corresponding tactile feedback ball 83. The tactile feedback ball 83 is urged by the tactile feedback coil spring 82 in the direction protruding from the accommodation hole 81, and always contacts the tactile feedback piece 61. When no object is inserted in the slot 23, each tactile feedback ball 83 contacts the corresponding tactile feedback piece 61 at a position closer to the panel portion 22 (closer to the slot 23) than the pivot 64.

The slot mechanism 1 is installed in a "smart ignition system" of a vehicle.

As shown in FIG. 8, on an instrument panel 90 in a passenger compartment, the slot mechanism 1 and an operation mechanism 91 are provided. A user of the vehicle manipulates the operation mechanism 91 to operate the smart ignition system. The case 10 of the slot mechanism 1 is located in the panel 90. The front side 22a of the panel portion 22 is substantially flush with the outer surface of the panel 90.

The electric configuration and the operation of the smart ignition system will now be described.

Figure 9:
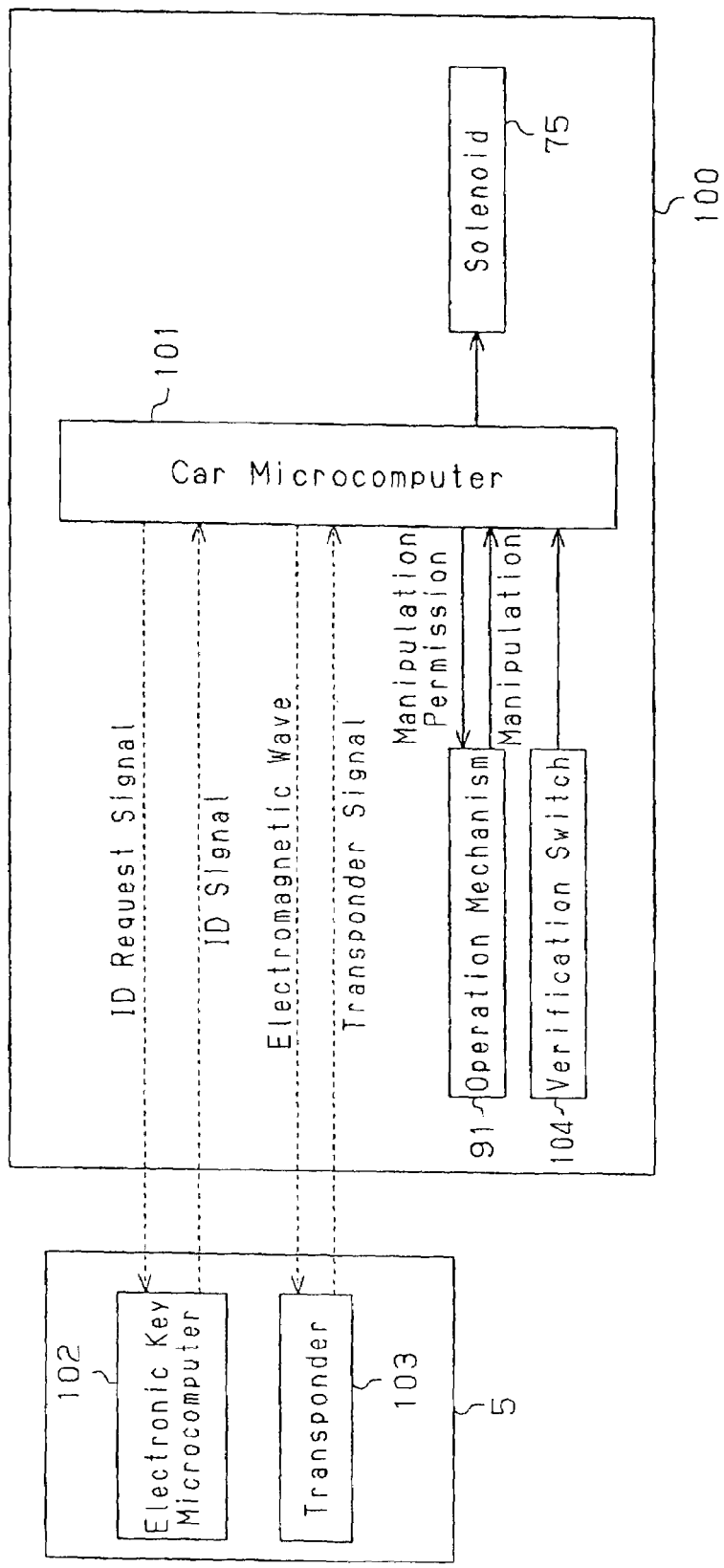
FIG. 9 is a diagrammatic view showing an electrical construction of the portable device of FIG. 2 and a car controller.

As shown in FIG. 9, the smart ignition system includes a car controller 100 mounted on the vehicle and the portable device 5 carried by a vehicle user. Although not illustrated, each of the portable device 5 and the car controller 100 has a transmission circuit and a reception circuit that wirelessly transmit various signals. The transmission circuit outputs transmission signals through an antenna connected to the transmission circuit. On the other hand, the reception circuit receives signals through an antenna connected to the reception circuit and demodulates the received signals.

The car controller 100 includes a car microcomputer 101, which functions as a verification portion. The car microcomputer 101 wirelessly transmits a data signal, which is an ID request signal, through the transmission circuit. The car microcomputer 101 has a memory that stores a unique ID code. The ID code is assigned to each of the vehicles owned by the user.

The portable device 5 has a portable device microcomputer 102 that is provided with a data signal, which is an ID signal. The ID signal contains for allowing the vehicle of the user to be identified from other vehicles. The ID code is stored in a memory provided in the portable device microcomputer 102. The portable device microcomputer 102 receives the ID request signal form the car microcomputer 101 through the reception circuit, and determines whether the ID request signal is the ID request signal of the user. Only when determining that the ID request signal is the ID request signal from the vehicle owned by the user, the portable device microcomputer 102 sends an ID signal to the car controller 100 through the transmission circuit.

The car microcomputer 101 compares the ID code stored in the memory and the ID code contained in the ID signal from the portable device 5. When the ID codes match, the car microcomputer 101 enables manipulation of the operation mechanism 91 by the user. Accordingly, the user can manipulate the operation mechanism 91 to start or stop the vehicle engine. In this manner, the ID verification between the portable device 5 and the car controller 100 through wireless transmission permits the user to start and stop the vehicle engine without inserting the portable device 5 into the slot 23.

The portable device 5 includes a transponder 103. The car microcomputer 101 is electrically connected to a verification switch 104 (see FIG. 4). As described below, the verification switch 104 is turned on when the shutter holder 11 is pressed to a predetermined position (the second position) and contacts the verification switch 104. When the verification switch 104 is on, the car microcomputer 101 produces an electromagnetic field in the interior of the slot mechanism 1 to activating the transponder 103. When the portable device 5 is inserted in the slot 23 of the slot mechanism 1, the transponder 103 is placed in the electromagnetic field, which produces electromotive force in the coil of the transponder 103. Based on the electromotive force, the transponder 103 transmits a transponder signal. The transponder signal contains an ID code that is the same as that stored in the portable device microcomputer 102.

The car microcomputer 101 verifies the ID code contained in the transponder signal against the ID code of the vehicle. If the ID codes match each other, the car microcomputer 101 enables manipulation of the operation mechanism 91 by the user.

Therefore, the verification switch 104 is turned on by inserting the portable device 5 in the slot mechanism 1 to cause the transponder 103 to generate a transponder signal. Accordingly, the ID verification is performed to enable start and stop of the vehicle engine. Thus, even if the battery of the portable device 5 is low, the engine can be started or stopped.

The operation of the slot mechanism 1 will now be described.

Figure 10:
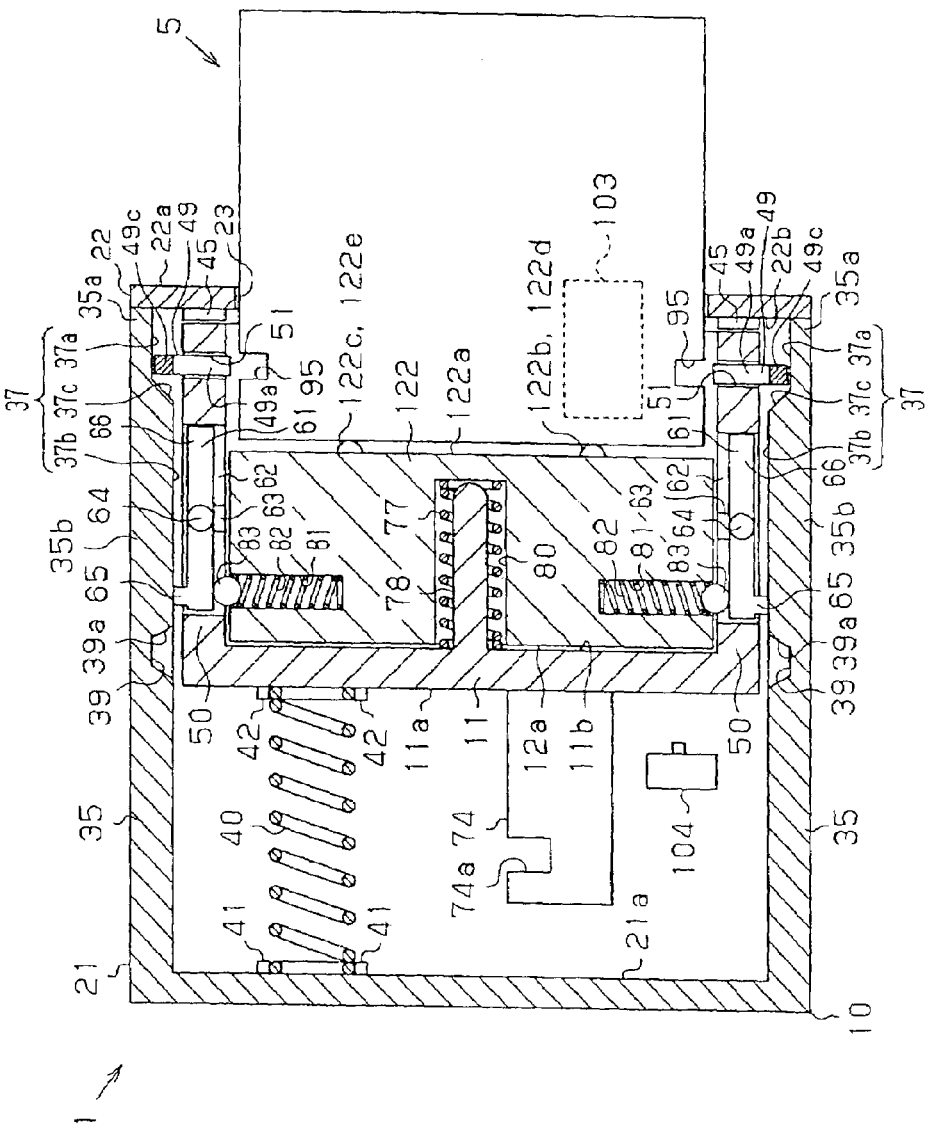
FIG. 10 is a cross-sectional view showing an operation of the slot mechanism shown in FIG. 2 taken along line A-A.

When the portable device 5 is inserted in the slot 23 as shown in FIG. 10, the shutter 122 is pushed into the case 10 by the portable device 5. The shutter 122 is moved in the depth direction (from the third position toward the fourth position) in the interior of the shutter holder 11 to contract the shutter coil spring 77. The guide pin 78 enters the guide hole 80.

Since the spring constant of the shutter coil spring 77 is sufficiently smaller than the holder coil spring 40, the holder coil spring 40 is scarcely contracted when the shutter 122 is moved in the interior of the shutter holder 11. The shutter holder 11 is therefore scarcely moved. The shutter 122 is moved to the fourth position where the surface 12a contacts the bottom inner surface 11b of the shutter holder 11.

The tactile feedback ball 83 in each accommodation hole 81 is urged toward the corresponding operational surface 37 by the force of the tactile feedback coil spring 82. As the shutter 122 is moved, each tactile feedback ball 83 is moved in the depth direction along the corresponding tactile feedback piece 61.

The position at which each tactile feedback ball 83 contacts the corresponding tactile feedback piece 61, or the point of action at which the force of the tactile feedback coil spring 82 acts on the tactile feedback piece 61, is moved from a position that is closer to the open end of the shutter holder 11 than the pivot 64 of the tactile feedback piece 61 to a position that is closer to the bottom of the shutter holder 11 than the pivot 64 through a position corresponding to the pivot 64. When the tactile feedback ball 83 is moved to a position closer to the opening of the shutter holder 11 than the pivot 64, the locking claw 65 is separated from the operational surface 37. An end 66 of each tactile feedback piece 61 opposite from the locking claw 65 is engaged with the retaining hole 62 of the shutter holder 11. The end 66 therefore does not protrude outward or contact the operational surface 37.

When each tactile feedback ball 83 is moved from a position closer to the opening of the shutter holder 11 than the pivot 64 to a position closer to the bottom, the tactile feedback piece 61 is pivoted so that the locking claw 65 contacts the operational surface 37. Therefore, when each tactile feedback ball 83 is closer to the bottom of the shutter holder 11 than to the pivot 64, a hand of a user inserting the portable device 5 receives frictional resistance due to contact between the locking claws 65 and the operational surfaces 37 by the force of the springs 82. That is, the user feels tactile feedback.

The moment about the pivot 64 that is generated by the force of the spring 82 and acts on the tactile feedback piece 61 is increased as the tactile feedback ball 83 approaches the bottom of the shutter holder 11. That is, the force with which the tactile feedback coil spring 82 presses the locking claw 65 against the engaging recess 39 is increased. This increases the frictional resistance. Accordingly, a user inserting the portable device 5 receives a greater tactile feedback as he/she presses the portable device 5 further.

Figure 11:
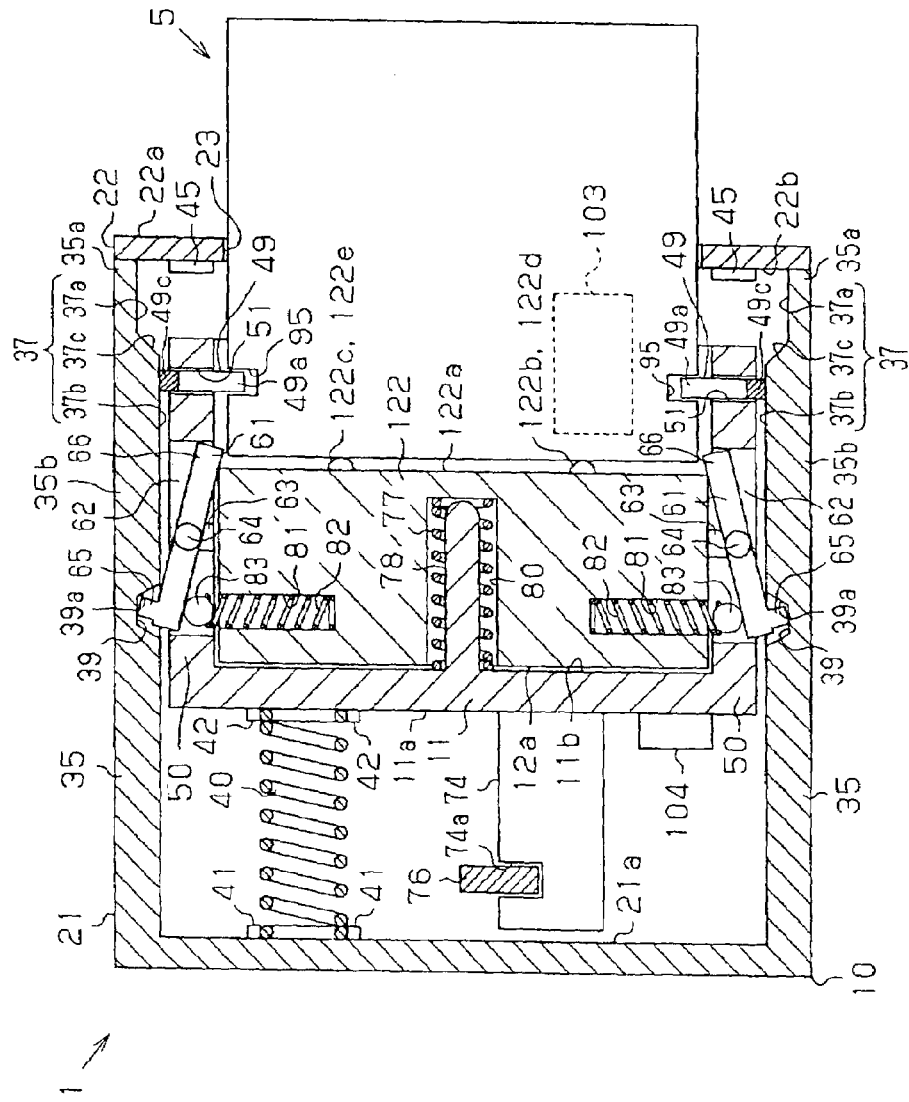
FIG. 11 is a cross-sectional view showing an operation of the slot mechanism shown in FIG. 2 taken along line A-A.

If the portable device 5 is pushed further from the state of FIG. 11 where the bottom inner surface 11b of the shutter holder 11 contacts the shutter 122, that is from the state where the shutter 122 is at the fourth position, the shutter holder 11 is pressed in the depth direction of the case main body 21 with the shutter 122 from the first position toward the second position.

At this time, as the shutter holder 11 is moved, the position at which the operational surface 37 contacts the short portion 49c of the locking piece 49 is moved from the thin portion 37a, which is closer to the opening of the case main body 21, to the thick portion 37b, which is closer to the bottom, through the inclined surface 37c. Therefore, the locking piece 49 is pressed into the interior of the shutter holder 11 by the distance corresponding to the value obtained by subtracting the thickness of the thin portion 35a from the thickness of the thick portion 35b. When the locking piece 49 is pressed into the interior of the shutter holder 11, the locking portion 49a of the locking piece 49 projects to the interior of the shutter holder 11. Therefore, each locking portion 49a is received by one of two locking recesses 95 formed in the portable device 5. The portable device 5 is locked to the shutter holder 11.

Specifically, the locking recesses 95 of the portable device 5 are formed in portions that face the locking portions 49a when the shutter 122 contacts the bottom inner surface 11b of the shutter holder 11.

When the shutter holder 11 contacts the stoppers 45, that is, when the shutter holder 11 is at the first position, the short portions 49c contact the thin portions 37a (see FIG. 5). The length of each locking portion 49a is substantially equal to a value obtained by subtracting the thickness of the thin portion 35a from the sum of the thickness of the functional wall 50 of the shutter holder 11 and the thick portion 35b of the case main body 21. Therefore, when the shutter holder 11 contacts the stopper 45, the locking portions 49a do not protrude in the interior of the shutter holder 11.

However, when the portable device 5 is pressed further and the shutter holder 11 is moved in the depth direction, the short portions 49c contact the corresponding inclined surfaces 37c. If the shutter holder 11 is moved further in the depth direction while the short portions 49c are contacting the inclined surfaces 37c, the short portions 49c are pushed along the inclined surfaces 37c and enter the locking piece holes 51. Accordingly, the locking portions 49a gradually protrude to the interior of the shutter holder 11. Each locking portion 49a enters the corresponding locking recess 95 of the portable device 5, which faces the locking portion 49a. When the shutter holder 11 is moved such that the short portions 49c contact the thick portions 37b as shown in FIG. 6, the amount by which each locking portion 49a enters the corresponding locking recess 95 is maximized. This locks the portable device 5 to the shutter holder 11.

After the portable device 5 locks the shutter holder 11, if the portable device 5 is pressed further against the force of the holder coil spring 40, the shutter holder 11 is moved further in the depth direction and reaches the second position, and the locking claw 65 of each tactile feedback piece 61 faces the engaging recess 39 of the corresponding operational surface 37. Since each tactile feedback piece 61 is urged toward the corresponding operational surface 37 by the force of the corresponding retaining spring 82, the locking claw 65 enters the engaging recess 39 along the inclined surface 39a.

Accordingly, the shutter holder 11 is engaged with the case main body 2.1 as shown in FIG. 11. Until the shutter holder 11 reaches the second position, the portable device 5 is held by the slot mechanism 1 while pressing the shutter 122 and the shutter holder 11 in the depth direction.

Specifically, the distance between the engaging recess 39 and the locking portion 49a with respect to the depth direction is substantially equal to the sum of the distance between the locking claw 65 of the tactile feedback piece 61 and the surface 122a of the shutter 122 contacting the portable device 5 (the distance between the accommodation hole 81 and the surface 122a) and the distance between the locking recess 95 of the portable device 5 and the surface 122a. Since the portable device 5 is locked to the shutter holder 11, even if the user releases the portable device 5, the shutter 122 is maintained at the pressed position (the fourth position) where the shutter 122 contacts the bottom inner surface 11b of the shutter holder 11. Therefore, each tactile feedback ball 83 is maintained at a position where the tactile feedback ball 83 presses the corresponding locking claw 65 into the corresponding engaging recess 39.

The shutter 122 is prevented from moving toward the slot 23 by the portable device 5, which is located to the shutter holder 11 by the locking pieces 49. The force of the spring 82 that presses the locking claw 65 into the engaging recess 39 is greater than the force of the holder coil spring 40 that presses the shutter holder 11 toward the slot 23. Therefore, even if the user releases the portable device 5, the shutter holder 11 continues being held by the case main body 21 at the second position. Unless the locking pieces 49 are released by a movement of the shutter holder 11 from the second position toward the first position (toward the slot 23), the portable device 5 is held locked to the shutter holder 11. As a result, the portable device 5 continues being held by the slot mechanism 1 in this state.

The verification switch 104 is provided in the interior of the case main body 21. When the shutter holder 11 reaches the second position, the verification switch 104 contacts the bottom outer surface 11a of the shutter holder 11 and is thus turned on. That is, the verification switch 104 functions as a detection portion for detecting the insertion of an object into the slot mechanism 1.

When the verification switch 104 is turned on, the car microcomputer 101 verifies the ID code contained in the transponder signal from the transponder 103 against the ID code of the vehicle.

When the ID codes match each other, if the user attempts to start the engine, the car microcomputer 101, to prevent the portable device 5 from coming off the slot 23 during driving, locks the portable device 5 to the slot mechanism 1 with the solenoid 75, thereby coupling the portable device 5 with the slot mechanism 1 by a force greater than the force by which the springs 82 press the locking claws 65 into the engaging recesses 39. Specifically, the car microcomputer 101 applies electric current to the solenoid 75.

Figure 12:
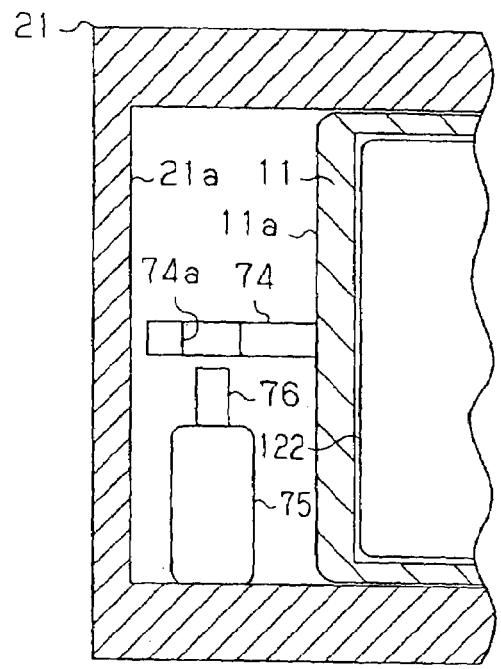
FIG. 12 is a partial cross-sectional view showing an operation of the slot mechanism shown in FIG. 2 taken along line D-D.

When the shutter holder 11 is at the second position as shown in FIG. 12, the notch 74a of the locking arm 74 of the shutter holder 11 is at a position corresponding to the plunger 76.

Figure 13:
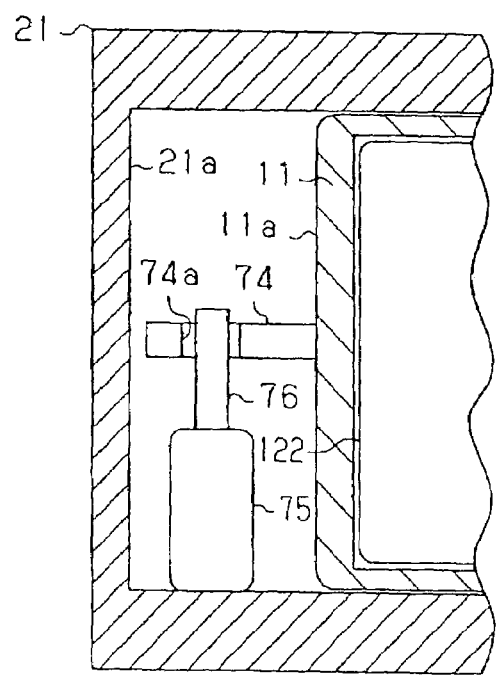
FIG. 13 is a partial cross-sectional view showing an operation of the slot mechanism shown in FIG. 2 taken along line D-D.

The applied electric current activates the solenoid 75 so that the retracted plunger 76 is projected as shown in FIG. 13.

The distal end of the plunger 76 enters the notch 74a of the locking arm 74. Accordingly, the shutter holder 11 is locked to the case main body 21. Since the portable device 5 is locked to the shutter holder 11, the portable device 5 is locked to the slot mechanism 1. In this state, the user cannot pull out the portable device 5.

When the user manipulates the operation mechanism 91 to stop the engine, the microcomputer 101 stops the current supplied to the solenoid 75, thereby moving the plunger 76 to the position shown in FIG. 12 (the retracted position). Accordingly, the shutter holder 11 is released from the case main body 21.

When the shutter holder 11 is not locked to the case main body 21 by the solenoid 75, coupling of the shutter holder 11 with the case main body 21 is maintained by the engagement between the locking claws 65 of the tactile feedback pieces 61 with the engaging recesses 39 by the force of the tactile feedback coil springs 82. Such an engaging state between the shutter holder 11 and the case main body 21 occurs when the ID verification is not established or when the user has not performed manipulation to start the engine even if the user inserts the portable device 5 into the slot mechanism 1 and turns the verification switch 104. In this state, the user can pull out the portable device 5 from the slot mechanism 1 against the force of the springs 82 engaging the shutter holder 11 with the case main body 21.

Specifically, in this state, although the portable device 5 is locked to the shutter holder 11, the shutter holder 11 is not locked to the case main body 21. Therefore, when the user attempts to pull out the portable device 5 with a force greater than the engaging force of the springs 82 between the shutter holder 11 and the case main body 21, the locking claw 65 of each tactile feedback piece 61 is moved along the inclined surface 39a of the corresponding engaging recess 39 and exists the engaging recess 39. The shutter holder 11 is moved toward the slot 23 with the portable device 5. Accordingly, a position of each operational surface 37 that contacts the short portion 49c of the locking piece 49 is moved from the thick portion 37b to the thin portion 37a through the inclined surface 37c.

Each short portion 49c, which has been pressed into the corresponding locking piece hole 51 by the corresponding thick portion 37b, is moved along the inclined surface 37c by the force of the locking coil spring 53 and is gradually projected toward the operational surface 37 form the locking piece hole 51. When each locking piece 49 protrudes toward the corresponding operational surface 37, the locking portion 49a, which has been in the interior of the shutter holder 11, or in the interior of the locking recess 95 of the portable device 5, gradually exists the locking recess 95 and is retracted into the locking piece hole 51. When the shutter holder 11 is moved to a position where the short portions 49c contact the thin surfaces 37a, the locking portion 49a is entirely removed from the locking recess 95. That is, the portable device 5 is released from the shutter holder 11. This enables the user to pull out the portable device 5 from the slot mechanism 1.

When the portable device 5 is pulled out from the slot mechanism 1, the shutter holder 11 is moved to a position (the first position) to contact the stopper 45 by the force of the holder coil spring 40. The shutter 122 is moved to a position (the third position) to contact the back side 22b of the panel portion 22 by the force of the shutter coil spring 77, and disconnects the interior of the slot mechanism 1 from the outside.

Next, a case where an object other than the portable device 5, such as a finger, is inserted into the slot mechanism 1 will be described.

Figure 14:
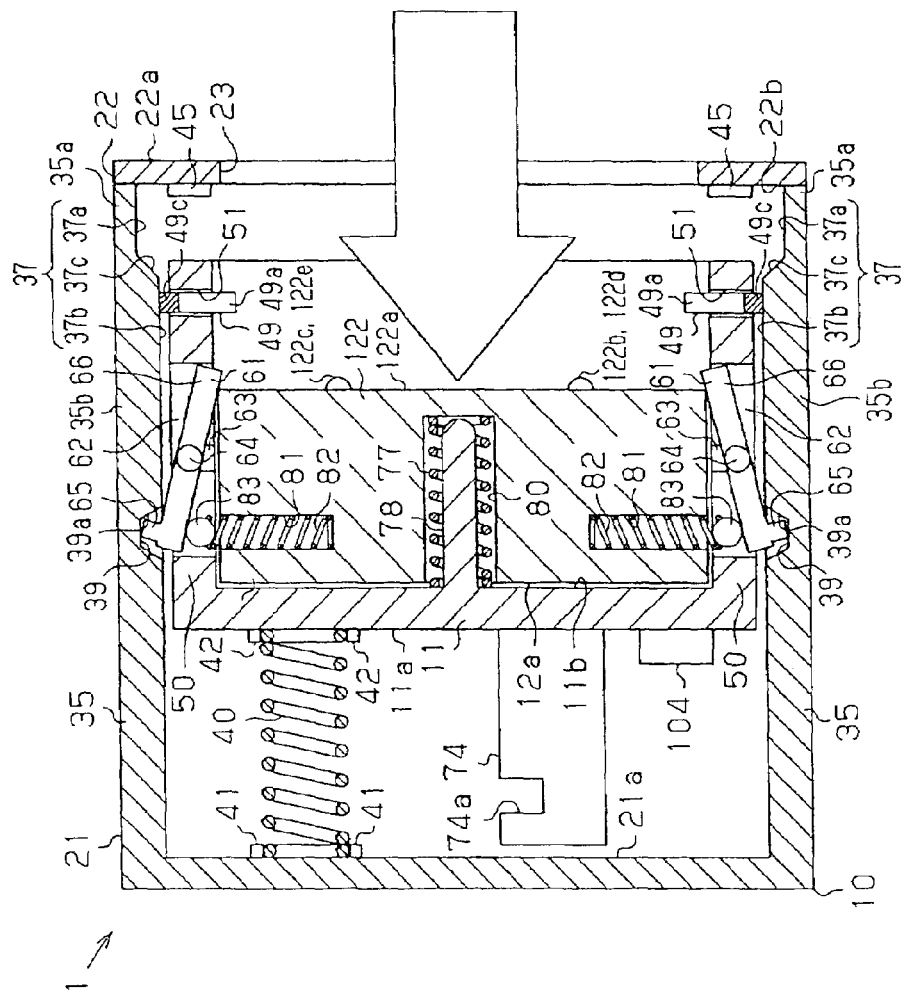
FIG. 14 is a cross-sectional view showing an operation of the slot mechanism shown in FIG. 2 taken along line A-A.
Figure 15:
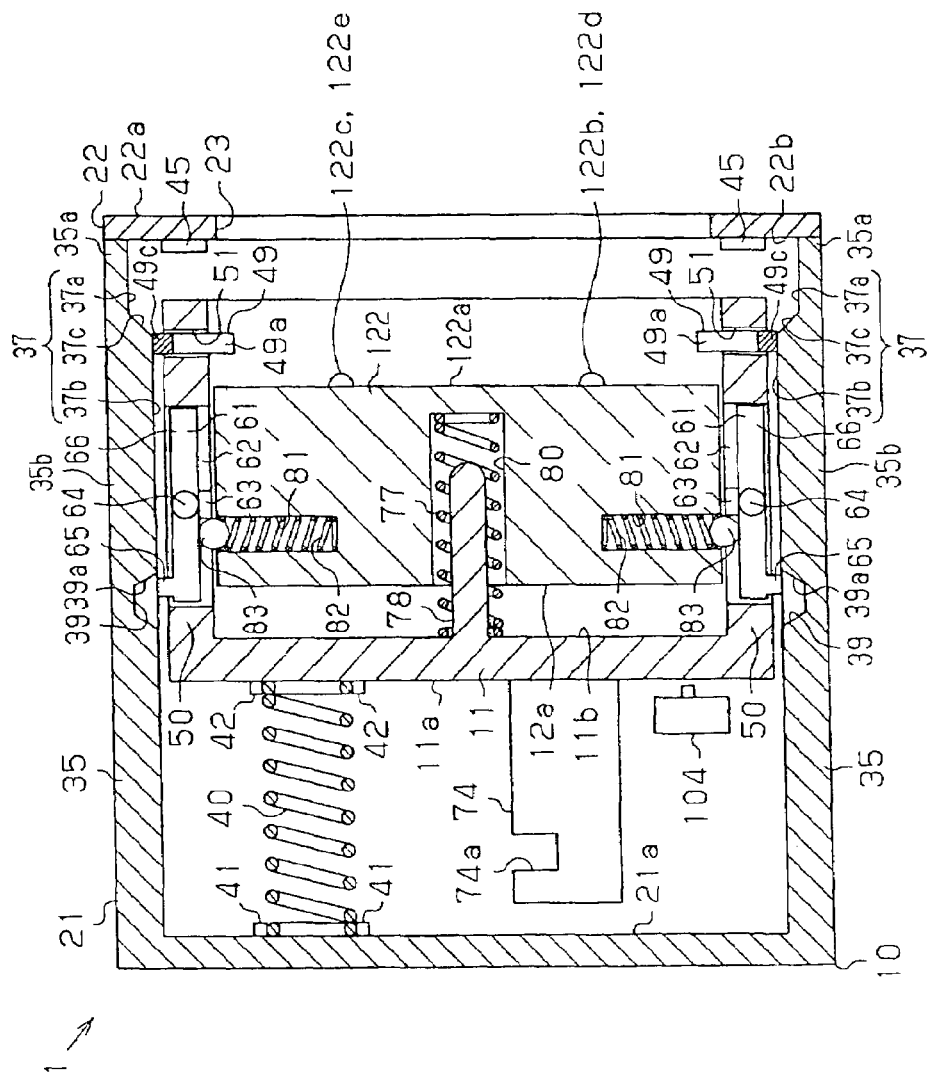
FIG. 15 is a cross-sectional view showing an operation of the slot mechanism shown in FIG. 2 taken along line A-A.

As shown in FIG. 14, an object other than the portable device 5, for example a finger, is inserted in the slot 23 and the shutter 122 is pushed into the case 10, the shutter 122 is moved to the fourth position, and the shutter holder 11 is moved to a position (the second position) where the shutter holder 11 is engaged with the case main body 21 as in the case where the portable device 5 is inserted in the slot 23.

When a finger is inserted, the bottom outer surface 11a of the shutter holder 11 contacts the verification switch 104 to turn the switch 104 on. However, since the ID verification does not take place, the plunger 76 is not activated and held retracted as shown in FIG. 12. Accordingly, the shutter holder 11 is not locked to the case main body 21.

When the user takes the finger off the shutter 122, there is nothing in the shutter holder 11 that prevents the shutter 122 toward the slot 23. The shutter 122 is there moved urged toward the slot 23 by the force of the shutter coil spring 77.

As the shutter 122 is moved toward the slot 23, positions at which the tactile feedback balls 83 press the tactile feedback pieces 61 are moved toward the slot 23. That is, the pressing positions are moved toward the pivot 64. This decreases the moment about each pivot 64 applied to the corresponding tactile feedback piece 61 by the force of the spring 82. Therefore, the force with which the tactile feedback coil spring 82 presses the locking claw 65 against the engaging recess 39 is decreased.

When the force of the holder coil spring 40 that presses the shutter holder 11 toward the slot 23 surpasses the engaging force between the shutter holder 11 and the case main body 21, each locking claw 65 is moved along the corresponding inclined surface 39a and comes off the engaging recess 39. The shutter holder 11 is then moved toward the slot 23 by the force of the spring 40.

The shutter holder 11 is moved toward the slot 23 by the force of the holder coil spring 40, and contacts the stopper 45 at the first position. The shutter 122 is moved toward the slot 23 by the force of the shutter coil spring 77, and contacts the back side 22b of the panel portion 22 at the third position. The shutter 122 then cuts off the interior of the slot mechanism 1 from the outside.

This embodiment further provides the following advantages.

(11) Each functional wall 50 of the shutter holder 11 includes the locking piece 49 for locking the portable device 5 to the shutter holder 11, and the tactile feedback piece 61 for engaging the shutter holder 11 in the case main body 21.

Thus, when the portable device 5 is inserted in the slot 23, the portable device 5 is locked to the shutter holder 11 by the locking pieces 49. Further, the shutter holder 11 is locked to the case main body 21 with the tactile feedback pieces 61. This holds the portable device 5 in the slot mechanism 1.

The engagement of the shutter holder 11 is disengaged from the case main body 21 by pulling the portable device 5. The portable device 5 is unlocked from the shutter holder 11 by moving the portable device 5 outward. The holder coil spring 40 is located between the inner surface 21a of the bottom of the case main body 21 and the outer surface 11a of the shutter holder 11. A shutter coil spring 77 is located between the bottom inner surface 11b of the shutter holder 11 and the shutter 122.

Therefore, even if the shutter 122 is pressed into the slot mechanism 1 by inserting the portable device 5 in the insertion slot 23, removing the portable device 5 from the slot 23 permits the shutter 122 to be moved to a position to close the slot 23 by the force of the springs 40, 77.

The locking pieces 49 do not lock objects other than the portable device 5 such as fingers. When an object other than the portable device 5 is inserted in the slot 23 and then removed, the shutter 122 is returned to the position to close the slot 23 by the force of the springs 40, 77. Therefore, even if pressed by a finger, the shutter 122 is not held pressed in the slot mechanism 1. Therefore, when an object such as the portable device 5 or a finger is not inserted in the slot mechanism 1, the shutter 122 reliably closes the slot 23.

(12) When the shutter holder 11 is moved toward the bottom of the case main body 21, the locking portion 49a of each locking piece 49 projects into the shutter holder 11 and is received by the corresponding locking recess 95 formed in the portable device 5. Therefore, the portable device 5 is reliably locked in the shutter holder 11.

(13) Each operational surface 37 of the case main body 21 includes the thin surface 37a, the thick surface 37b, and the inclined surface 37c. Each locking piece 49 is always brought into contact with the corresponding operational surface 37 of the case main body 21 by the force of the corresponding spring 53.

As a result, when the shutter holder 11 is moved to the bottom of the case main body 21, each locking piece 49 is guided by the corresponding operational surface 37 and pressed into the corresponding locking piece hole 51. Thus, since the locking portion 49a of each locking piece 49 projects into the interior of the shutter holder 11, the portable device 5 is reliably locked.

(14) The thick portion 37b of each operational surface 37 of the case main body 21 includes the engaging recess 39. Each tactile feedback piece 61 includes a locking claw 65 projecting toward the corresponding operational surface 37. The shutter includes the accommodation holes 81 facing the functional walls 50. In each accommodation hole 81, the tactile feedback coil spring 82 and the tactile feedback ball 83 are provided. The tactile feedback ball 83 is protruded from and retracted in the accommodation hole 81. The tactile feedback ball 83 is always brought into contact with the corresponding tactile feedback piece 61 by the force of the tactile feedback coil spring 82.

As a result, when the shutter 122 is pressed to the bottom inner surface 11b of the shutter holder 11, each locking claw 65 is pressed into the corresponding engaging recess 39 by the force of the corresponding retaining spring 82 with the corresponding tactile feedback ball 83. Accordingly, the shutter holder 11 is engaged with the case main body 21 and held in this engaged state.

As a result, when inserted in the slot 23, the portable device 5 is held in the slot mechanism 1. When a user attempts to pull the portable device 5 from the slot mechanism 1, if the user pulls the portable device 5 by a force greater than the engagement force, the shutter holder 11, which is locking the portable device 5, is moved. Accordingly, the state in which the shutter holder 11 is held by the case main body 21 and the state in which the portable device 5 is locked to the shutter holder 11 are cancelled. This permits the portable device 5 to be pulled out of the slot mechanism 1. After the portable device 5 is pulled out, the slot 23 is closed by the shutter 122 again.

(15) The shutter holder 11 has the locking arm 74. The case main body 21 has the solenoid 75 located in the vicinity of the bottom inner surface 21a. The plunger 76 of the solenoid 75 projects and retracts in a direction perpendicular to the locking arm 74. When the plunger 76 is engaged with the notch 74a of the locking arm 74, the shutter holder 11 is locked to the case main body 21. This prevents the portable device 5 from coming off the slot mechanism 1 and from being erroneously pulled out.

(16) The verification switch 104, which is provided in the case main body 21, is turned on as the shutter holder 11 contacts the switch 104 when the shutter holder is moved to a position to engage with the case main body 21. When the verification switch 104 is turned on, the car microcomputer 101 generates an electromagnetic field. The portable device 5 (correct inserted body), which is carried by the user of the vehicle, has the transponder 103. The transponder 103 outputs a transponder signal based on the electromagnetic field. The car microcomputer 101 verifies the ID code contained in the transponder signal against the ID code of the vehicle.

Therefore, when an object other than the portable device 5, for example, a finger, is inserted in the slot 23, the ID verification performed by the car microcomputer 101 is not established. In this case, the plunger 76 stays retracted and the shutter holder 11 is not locked to the case main body 21. Therefore, even if an object other than the portable device 5 is inserted in the slot mechanism 1 and then pulled out, the shutter 122 does not stay at the pressed position.

It should be apparent to those skilled in the art that the present invention may be embodied in many other specific forms without departing from the spirit or scope of the invention. Particularly, it should be understood that the invention may be embodied in the following forms.

In the illustrated embodiment, the case 10 of the slot mechanism 1 is shaped as a box. However, the case 10 may be shaped in other forms. For example, the case 10 may be cylindrical. The cross-sectional shape of the interior of the slot mechanism 1 may conform to the shape of the portable device 5. For example, the portable device 5 may be cylindrical, and the cross-section of the slot mechanism 1 may be circular.

In the illustrated embodiment, the locking portion 49a of each locking piece 49 is guided by the corresponding operational surface 37 including the thin portion 37a, the thick portion 37b, and the inclined surface 37c, and is projected into the interior of the shutter holder 11. This configuration may be changed. For example, the portable device 5 may be locked to the shutter holder 11 by electrically controlling the movement of the locking pieces 49.

In the illustrated embodiment, the tactile feedback pieces 61 are pivoted to cause the shutter holder 11 to be engaged with the case main body 21. However, the tactile feedback pieces 61 may be formed of a flexible material. In this case, when each tactile feedback piece 61 is pressed into the shutter 122, the tactile feedback piece 61 is pressed toward the operational surface 37 so that the shutter holder 11 is engaged with the case main body 21.

In the illustrated embodiments, the side of each engaging recess 39 functions as the inclined surface 39a. However, the side of each locking claw 65 may function as an inclined surface.

In the illustrated embodiment, the portable device 5 is locked to the slot mechanism 1 after the engine is started with the operation mechanism 91. That is, the plunger 76 is protruded so that the shutter holder 11 is locked to the case main body 21 after the start of the engine. This may be changed such that the portable device 5 is locked to the slot mechanism 1 when the ID codes are verified by the car microcomputer 101.

In the illustrated embodiment, the plunger 76 of the solenoid 75 directly enters the notch 74a of the locking arm 74 so that the shutter holder 11 is locked to the case main body 21. However, the plunger 76 may be coupled to the locking lever with a cam. In this case, when the plunger 76 is projected, locking lever enters the notch 74a of the locking arm 74, so that the shutter holder 11 is locked.

Therefore, the present examples and embodiments are to be considered as illustrative and not restrictive and the invention is not to be limited to the details given herein, but may be modified within the scope and equivalence of the appended claims.

The invention claimed is:

1. A slot mechanism having an accommodation space into which an insertion object may be inserted through a slot, the insertion object having an arcuate insertion surface, the slot mechanism comprising:

a shutter located in the accommodation space, wherein the shutter is movable along an insertion direction of the insertion object, wherein, when the insertion object is inserted into the accommodation space, the shutter is pressed by the arcuate insertion surface of the insertion object and moved toward the back of the accommodation space, and wherein, when the insertion object is removed from the accommodation space, the shutter is moved toward the slot to close the slot, wherein the shutter is shaped like a rectangular parallelepiped having a rectangle shutter surface that faces the insertion object when the insertion object is inserted into the slot;

wherein the shutter surface has a plurality of projections, each of which contacts the arcuate insertion surface of the insertion object when the insertion object is inserted into the slot;

wherein two regions are defined on the shutter surface and each region corresponds to a half of the insertion surface, at least one projection is located in each region, wherein the projections are also located so that a top of the arcuate insertion surface is disposed between the projections, wherein the shutter and the projections are integrally formed of the same material, and wherein the projections are semispherical; and wherein the slot mechanism further comprises:

a shutter holder located in the accommodation space, the shutter holder being movable between a first position and a second position along an insertion direction of the insertion object into the accommodation space, the second position being closer to the back of the accommodation space than the first position is to the back of the accommodation space, the shutter being located in a shutter space defined in the shutter holder, the shutter being movable relative to the shutter holder between a third position and a fourth position along the insertion direction, the fourth position being closer to the back of the shutter space than the third position is to the back of the shutter space, wherein, when the insertion object is inserted into the accommodation space, the shutter is pressed by the insertion object and moved to the fourth position, and the shutter holder is pressed by the shutter, which has been moved to the fourth position, to the second position, and wherein when the insertion object is removed from the accommodation space, the shutter holder is moved to the first position and the shutter is moved to the third position, so that the slot is closed by the shutter;

an insertion object locking mechanism, wherein the locking mechanism locks the insertion object to the shutter holder when the shutter is moved to the fourth position by the insertion object; and a holder retaining mechanism, wherein the holder retaining mechanism holds the shutter holder at the second position when the holder retaining mechanism is moved to the second position by the shutter.

2. The slot mechanism according to claim 1, wherein the insertion object is substantially shaped like a rectangular parallelepiped, and the insertion surface is a rectangle, and
   two of the projections are located on each region; and
   each projection is located at a corner of a rectangle that is similar to the contour of the insertion surface.

3. The slot mechanism according to claim 2, further comprising a light source for causing the projections to emit light.

4. The slot mechanism according to claim 3, further comprising a case that defines the accommodation space, wherein the case has the light source, and wherein the shutter has an optical waveguide for guiding light generated by the light source to the projections.

5. The slot mechanism according to claim 4, wherein the optical waveguide is made of a material that permits light to pass through.

6. The slot mechanism according to claim 5, wherein the projections and the optical waveguide are formed integrally of a transparent material.

7. A smart ignition system, comprising:
   a portable device having an arcuate insertion surface;
   a slot mechanism having an accommodation space into which the portable device is inserted through a slot;
   a detection portion for detecting insertion of the portable device into the accommodation space; and
   a verification portion for determining whether the inserted portable device is a correct portable device;
   wherein the slot mechanism includes:
   a shutter located in the accommodation space, wherein the shutter is movable along an insertion direction of the portable device, wherein, when the portable device is inserted into the accommodation space, the shutter is pressed by the arcuate insertion surface of the portable device and moved toward the back of the accommodation space, and wherein, when the portable device is removed from the accommodation space, the shutter is moved toward the slot to close the slot,
   wherein the shutter is shaped like a rectangular parallelepiped having a rectangle shutter surface that faces the arcuate insertion surface of the portable device when the portable device is inserted into the slot,
   wherein the shutter surface has a plurality of projections, each of which contacts the arcuate insertion surface of the portable device when the portable device is inserted into the slot,
   wherein, two regions are defined on the shutter surface and each region corresponds to a half of the insertion surface, at least one projection is located in each region,
   wherein the projections are also located so that a top of the arcuate insertion surface is disposed between the proejctions,
   wherein the shutter and the projections are integrally formed of the same material, and
   wherein the projections are semispherical.

8. The system according to claim 7, wherein the portable device is substantially shaped like a rectangular parallelepiped, and the insertion surface is a rectangle;
   wherein two of the projections are located on each region; and
   each projection is located at a corner of a rectangle that is similar to the contour of the insertion surface.

9. The system according to claim 7, further comprising:
   a light source for causing the projections to emit light; and
   a case that defines the accommodation space,
   wherein the case has the light source, and wherein the shutter has an optical waveguide for guiding light generated by the light source to the projections, and
   wherein the projections and the optical waveguide are formed integrally of a transparent material.

10. The system according to claim 7, wherein the portable device transmits a signal containing a unique ID code to the verification portion, and wherein the verification portion determines whether the ID code contained in the received signal is an ID code given to a correct portable device,
   wherein the portable device includes a transponder, wherein, when the portable device is inserted in the accommodation space, the transponder outputs a transponder signal containing the ID code by receiving electromagnetic waves generated by the slot mechanism;
   wherein the slot mechanism further includes a case that defines the accommodation space, and
   wherein, when the portable device is inserted to the back of the accommodation space, the detection portion is located in part of the case that is close to the transponder.

* * * * *

UNITED STATES PATENT AND TRADEMARK OFFICE
CERTIFICATE OF CORRECTION

PATENT NO. : 7,392,675 B2  
APPLICATION NO. : 11/045698  
DATED : July 1, 2008  
INVENTOR(S) : Shozo Kito It is certified that error appears in the above-identified patent and that said Letters Patent is hereby corrected as shown below:

Column 7  
Line 22, delete "grooves 11a" and insert therefor -- grooves 110a --.  
Line 42, delete "Hemispherical" and insert therefor -- semispherical --.

Column 9  
Line 23, delete "sidewalks" and insert therefor -- sidewalls --.

Column 21  
Line 29, delete "acconunodation" and insert therefor -- accommodation --.

Signed and Sealed this

Ninth Day of September, 2008

JON W. DUDAS  
*Director of the United States Patent and Trademark Office*